(12) United States Patent
Okada et al.

(10) Patent No.: US 12,371,765 B2
(45) Date of Patent: Jul. 29, 2025

(54) SEAMLESS STEEL PIPE SUITABLE FOR USE IN SOUR ENVIRONMENT

(71) Applicant: NIPPON STEEL CORPORATION, Tokyo (JP)

(72) Inventors: Seiya Okada, Tokyo (JP); Hiroki Kamitani, Tokyo (JP); Nobuaki Komatsubara, Tokyo (JP); Yusaku Tomio, Tokyo (JP); Shohei Ikeda, Tokyo (JP); Naoya Shirasawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 546 days.

(21) Appl. No.: 17/432,146

(22) PCT Filed: Mar. 16, 2020

(86) PCT No.: PCT/JP2020/011432
§ 371 (c)(1),
(2) Date: Aug. 19, 2021

(87) PCT Pub. No.: WO2020/196019
PCT Pub. Date: Oct. 1, 2020

(65) Prior Publication Data
US 2022/0186350 A1 Jun. 16, 2022

(30) Foreign Application Priority Data
Mar. 22, 2019 (JP) ................. 2019-054514

(51) Int. Cl.
*C22C 38/32* (2006.01)
*B32B 1/08* (2006.01)
*B32B 5/14* (2006.01)
*B32B 15/18* (2006.01)
*C21D 3/04* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/24* (2006.01)
*C22C 38/26* (2006.01)
*C22C 38/28* (2006.01)
*C21D 8/10* (2006.01)

(52) U.S. Cl.
CPC ............... *C22C 38/32* (2013.01); *B32B 1/08* (2013.01); *B32B 5/145* (2013.01); *B32B 15/18* (2013.01); *C21D 3/04* (2013.01); *C22C 38/001* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C21D 8/10* (2013.01)

(58) Field of Classification Search
CPC ........... B32B 1/08; B32B 15/18; B32B 5/145; C21D 1/25; C21D 1/76; C21D 3/04; C21D 8/10; C21D 8/105; C21D 9/08; C22C 38/001; C22C 38/002; C22C 38/005; C22C 38/02; C22C 38/04; C22C 38/06; C22C 38/20; C22C 38/22; C22C 38/24; C22C 38/26; C22C 38/28; C22C 38/30; C22C 38/32; C22C 38/40
See application file for complete search history.

(56) References Cited

U.S. PATENT DOCUMENTS

| | | | |
|---|---|---|---|
| 11,155,893 B2 * | 10/2021 | Yoshida | .................. C22C 38/44 |
| 2006/0169375 A1 | 8/2006 | Tanida | |
| 2007/0137736 A1 | 6/2007 | Omura et al. | |
| 2011/0315276 A1 | 12/2011 | Bosch et al. | |
| 2013/0264123 A1 | 10/2013 | Altschuler et al. | |
| 2016/0369759 A1 | 12/2016 | Masuda et al. | |
| 2017/0349964 A1 | 12/2017 | Yuga et al. | |
| 2019/0055617 A1 | 2/2019 | Okatsu et al. | |
| 2020/0040436 A1 * | 2/2020 | Arai | ........................ C22C 38/54 |
| 2021/0017635 A1 | 1/2021 | Kamitani et al. | |

FOREIGN PATENT DOCUMENTS

| | | | |
|---|---|---|---|
| JP | 59232220 A | | 12/1984 |
| JP | 62253720 A | | 11/1987 |
| JP | 06322478 A | | 11/1994 |
| JP | 08311551 A | | 11/1996 |
| JP | 09067624 A | | 3/1997 |
| JP | 09256050 A | | 9/1997 |
| JP | 2000256783 A | | 9/2000 |
| JP | 2000297344 A | | 10/2000 |
| JP | 2005350754 A | | 12/2005 |
| JP | 2012026030 A | | 2/2012 |
| JP | 2012519238 A | | 8/2012 |
| JP | 2018053357 A | * | 4/2018 |
| WO | 2005035815 A1 | | 4/2005 |

(Continued)

OTHER PUBLICATIONS

NPL: on-line translation of JP-2018053357-A, Apr. 2018 (Year: 2018).*

*Primary Examiner* — Jie Yang
(74) *Attorney, Agent, or Firm* — Greer, Burns & Crain, Ltd.

(57) ABSTRACT

The seamless steel pipe according to the present disclosure includes a base material and a decarburized layer formed on the surface of the base material. The chemical composition of the base material consists of, in mass %, C: 0.20 to 0.50%, Si: 0.05 to 0.50%, Mn: 0.01 to 1.00%, P: 0.0300% or less, S: 0.0100% or less, Al: 0.005 to 0.100%, Cr: 0.30 to 1.20%, Mo: 0.30 to 1.50%, Ti: 0.002 to 0.050%, V: 0.01 to 0.30%, Nb: 0.002 to 0.100%, B: 0.0001 to 0.0050%, N: 0.0100% or less, O: 0.0050% or less, and with the balance being Fe and impurities. The base material has a yield strength of 655 MPa or more, and a yield ratio of 85.0% or more. The decarburized layer has a depth of 150 μm or less.

17 Claims, No Drawings

(56) References Cited

FOREIGN PATENT DOCUMENTS

| WO | 2015129617 | A1 | | 9/2015 | | |
|---|---|---|---|---|---|---|
| WO | 2016103538 | A1 | | 6/2016 | | |
| WO | WO-2018066689 | A1 | * | 4/2018 | ............... | C21D 7/13 |
| WO | 2019188869 | A1 | | 10/2019 | | |

* cited by examiner

SEAMLESS STEEL PIPE SUITABLE FOR USE IN SOUR ENVIRONMENT

This is a National Phase Application filed under 35 U.S.C. § 371, of International Application No. PCT/JP2020/011432, filed Mar. 16, 2020, the contents of which are incorporated by reference.

TECHNICAL FIELD

The present disclosure relates to a seamless steel pipe, and more particularly relates to a seamless steel pipe suitable for use in a sour environment.

BACKGROUND ART

Due to the deepening of oil wells and gas wells (hereunder, oil wells and gas wells are collectively referred to as "oil wells"), there is a demand to enhance the strength of oil-well steel pipes. Specifically, 80 ksi grade (yield strength is 80 to less than 95 ksi, that is, 552 to less than 655 MPa) and 95 ksi grade (yield strength is 95 to less than 110 ksi, that is, 655 to less than 758 MPa) oil-well steel pipes are widely utilized, and recently requests are also starting to be made for 110 ksi grade (yield strength is 110 to less than 125 ksi, that is, 758 to less than 862 MPa), and 125 ksi grade (yield strength is 125 to 140 ksi, that is, 862 to 965 MPa) oil-well steel pipes.

Most deep wells are in a sour environment containing corrosive hydrogen sulfide. In the present description, the term "sour environment" means an environment which contains hydrogen sulfide and is acidified. Note that a sour environment may contain carbon dioxide. Oil-well steel pipes for use in such sour environments are required to have not only high strength, but to also have sulfide stress cracking resistance (hereunder, referred to as "SSC resistance").

Technology for enhancing the SSC resistance of steel materials as typified by oil-well steel pipes is disclosed in Japanese Patent Application Publication No. 62-253720 (Patent Literature 1), Japanese Patent Application Publication No. 59-232220 (Patent Literature 2), Japanese Patent Application Publication No. 6-322478 (Patent Literature 3), Japanese Patent Application Publication No. 8-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8) and Japanese Patent Application Publication No. 2012-26030 (Patent Literature 9).

Patent Literature 1 proposes a method for improving the SSC resistance of steel for oil wells by reducing impurities such as Mn and P. Patent Literature 2 proposes a method for improving the SSC resistance of steel by performing quenching twice to refine the grains.

Patent Literature 3 proposes a method for improving the SSC resistance of a 125 ksi grade steel material by refining the steel microstructure by a heat treatment using induction heating. Patent Literature 4 proposes a method for improving the SSC resistance of steel pipes of 110 to 140 ksi grade by enhancing the hardenability of the steel by utilizing a direct quenching process and also increasing the tempering temperature.

Patent Literature 5 and Patent Literature 6 each propose a method for improving the SSC resistance of a steel for low-alloy oil country tubular goods of 110 to 140 ksi grade by controlling the shapes of carbides. Patent Literature 7 proposes a method for improving the SSC resistance of steel materials of 125 ksi grade or higher by controlling the dislocation density and the hydrogen diffusion coefficient to desired values.

Patent Literature 8 proposes a method for improving the SSC resistance of steel of 125 ksi grade by subjecting a low-alloy steel containing 0.3 to 0.5% of C to quenching multiple times. Patent Literature 9 proposes a method for controlling the shapes or number of carbides by employing a tempering process composed of a two-stage heat treatment. More specifically, in Patent Literature 9, a method is proposed that enhances the SSC resistance of 125 ksi grade steel by suppressing the number density of large $M_3C$ particles or $M_2C$ particles.

CITATION LIST

Patent Literature

Patent Literature 1: Japanese Patent Application Publication No. 62-253720
Patent Literature 2: Japanese Patent Application Publication No. 59-232220
Patent Literature 3: Japanese Patent Application Publication No. 6-322478
Patent Literature 4: Japanese Patent Application Publication No. 8-311551
Patent Literature 5: Japanese Patent Application Publication No. 2000-256783
Patent Literature 6: Japanese Patent Application Publication No. 2000-297344
Patent Literature 7: Japanese Patent Application Publication No. 2005-350754
Patent Literature 8: National Publication of International Patent Application No. 2012-519238
Patent Literature 9: Japanese Patent Application Publication No. 2012-26030

SUMMARY OF INVENTION

Technical Problem

The above Patent Literatures 1 to 9 each disclose a technique to improve the SSC resistance of a steel material. Meanwhile, in a production process of seamless steel pipe, an ultrasonic inspection may be performed on a seamless steel pipe to detect surface defects and/or inner defects in the seamless steel pipe in a final refining process in the production process. In this case, the seamless steel pipe is required to have excellent accuracy of ultrasonic inspection. However, in the above Patent Literatures 1 to 9, there is no description on the accuracy of ultrasonic inspection in a seamless steel pipe.

An objective of the present disclosure to provide a seamless steel pipe which has a yield strength of 655 MPa or more (95 ksi or more) and excellent SSC resistance in a sour environment, and can achieve excellent accuracy of ultrasonic inspection.

Solution to Problem

The seamless steel pipe according to the present disclosure includes a base material and a decarburized layer formed on the surface of the base material. The chemical composition of the base material consists of, in mass %, C: 0.20 to 0.50%, Si: 0.05 to 0.50%, Mn: 0.01 to 1.00%, P:

0.0300% or less, S: 0.0100% or less, Al: 0.005 to 0.100%, Cr: 0.30 to 1.20%, Mo: 0.30 to 1.50%, Ti: 0.002 to 0.050%, V: 0.01 to 0.30%, Nb: 0.002 to 0.100%, B: 0.0001 to 0.0050%, N: 0.0100% or less, O: 0.0050% or less, Ca: 0 to 0.0100%, Mg: 0 to 0.0100%, Zr: 0 to 0.0100%, rare earth metal: 0 to 0.0100%, Co: 0 to 0.50%, W: 0 to 0.50%, Cu: 0 to 0.50%, and Ni: 0 to 0.50%, with the balance being Fe and impurities. The yield strength of the base material is 655 MPa or more, and the yield ratio of the base material is 85.0% or more. The decarburized layer has a depth of 150 μm or less.

Advantageous Effects of Invention

The seamless steel pipe according to the present disclosure has a yield strength of 655 MPa or more (95 ksi or more) and excellent SSC resistance in a sour environment, and can achieve excellent accuracy of ultrasonic inspection.

DESCRIPTION OF EMBODIMENTS

The present inventors conducted investigations and studies regarding a method for obtaining excellent SSC resistance and further achieving excellent accuracy of ultrasonic inspection in a seamless steel pipe that is assumed to be used in a sour environment, and obtained the following findings.

The present inventors first studied a seamless steel pipe having a yield strength of 655 MPa or more (95 ksi or more) and excellent SSC resistance. As a result, they came to consider that if a seamless steel pipe has a chemical composition consisting of, in mass %, C: 0.20 to 0.50%, Si: 0.05 to 0.50%, Mn: 0.01 to 1.00%, P: 0.0300% or less, S: 0.0100% or less, Al: 0.005 to 0.100%, Cr: 0.30 to 1.20%, Mo: 0.30 to 1.50%, Ti: 0.002 to 0.050%, V: 0.01 to 0.30%, Nb: 0.002 to 0.100%, B: 0.0001 to 0.0050%, N: 0.0100% or less, O: 0.0050% or less, Ca: 0 to 0.0100%, Mg: 0 to 0.0100%, Zr: 0 to 0.0100%, rare earth metal: 0 to 0.0100%, Co: 0 to 0.50%, W: 0 to 0.50%, Cu: 0 to 0.50%, and Ni: 0 to 0.50%, with the balance being Fe and impurities, and a yield ratio of 85.0% or more, there is possibility that it has a yield strength of 655 MPa or more and excellent SSC resistance.

Accordingly, the present inventors have produced various seamless steel pipes having the above described chemical composition and the above described mechanical properties (that is, a yield strength of 655 MPa or more, and a yield ratio of 85.0% or more), and conducted investigations and studies on the accuracy of ultrasonic inspection thereof. Specifically, a seamless steel pipe is irradiated with ultrasonic wave by the below described method to determine a ratio of signal heights between an artificial defect and noise as an SN ratio. When the SN ratio is low, it becomes difficult to discriminate a defect from noise. In other words, it can be determined that excellent accuracy of ultrasonic inspection can be achieved with a seamless steel pipe which exhibits a high SN ratio in ultrasonic inspection.

In the seamless steel pipe having the above described chemical composition and the above described mechanical properties, there was a case in which the SN ratio decreased, disabling to achieve excellent accuracy of ultrasonic inspection. Accordingly, the present inventors have conducted investigations and studies on causal factors of deterioration in the accuracy of ultrasonic inspection in the seamless steel pipe having the above described chemical composition and the above described mechanical properties. As a result, they have found that in the seamless steel pipe having the above described chemical composition, a decarburized layer is formed in an outer layer of the seamless steel pipe upon attempting to obtain the above described mechanical properties.

The decarburized layer means a layer with a decreased C content formed as a result of carbon (C) being oxidized and withdrawn as a gas in a surface portion of a seamless steel pipe. As described above, the chemical composition of the seamless steel pipe according to the present embodiment has a relatively high C content of 0.20 to 0.50%. For that reason, the seamless steel pipe according to the present embodiment has a large difference in the C content in the surface of the base material (that is, the interface between the decarburized layer and the base material). As a result, the seamless steel pipe according to the present embodiment is likely to reflect and diffract ultrasonic waves at the interface between the decarburized layer and the base material.

When ultrasonic waves are reflected and/or diffracted at the interface between the decarburized layer and the base material, the intensity of the ultrasonic wave which reaches a defect will decrease. As a result, the SN ratio decreases in ultrasonic inspection, thus deteriorating the accuracy of ultrasonic inspection of seamless steel pipe. In this way, in the seamless steel pipe according to the present embodiment, when a decarburized layer is formed, the accuracy of ultrasonic inspection is likely to deteriorate due to the fact that the C content is relatively high.

Based on the above described findings, the present inventors came to consider that if a seamless steel pipe in which no decarburized layer is formed in an outer layer can be produced, it is possible to improve the accuracy of ultrasonic inspection of the seamless steel pipe. However, as a result of detailed studies conducted by the present inventors, it came to be clear that the depth of the decarburized layer formed in an outer layer of a seamless steel pipe is affected according to the chemical composition of the base material and the production process of the seamless steel pipe.

Specifically, when a steel material contains a high proportion of Cr, the decarburized layer tends to be formed shallowly. In the same manner, when a steel material contains a high proportion of Si, the decarburized layer tends to be formed deeply. In this way, the depth of the decarburized layer is affected according to the chemical composition of the base material. Further, as described above, the decarburized layer is formed by the oxidation of the C in a surface portion of a seamless steel pipe. Therefore, when the seamless steel pipe is produced, in a case where a high temperature heating is performed, the decarburized layer is likely to be formed deeply. In this way, the depth of the decarburized layer is also affected according to the production process.

Further, in a seamless steel pipe having the above described chemical composition, upon attempting to obtain the above described mechanical properties, a decarburized layer will have been formed from the nature of the production process. In other words, to stably achieve excellent accuracy of ultrasonic inspection in a seamless steel pipe having the above described chemical composition and the above described mechanical properties, it will be satisfactory that excellent accuracy of ultrasonic inspection can be achieved even if a decarburized layer is present in the outer layer.

Accordingly, the present inventors conducted a detailed study on a technique for improving the accuracy of ultrasonic inspection for a seamless steel pipe including a base material having the above described chemical composition and the above described mechanical properties, and a decarburized layer formed on the surface of the base material. As a result, the present inventors have found that it is possible to improve the accuracy of ultrasonic inspection of the seamless steel pipe, even if a decarburized layer is formed, by decreasing the depth of the decarburized layer.

Regarding the reason of this, the present inventors considers as follows. As described above, a decarburized layer has a decreased C content. For that reason, the microstructure of the decarburized layer is principally composed of ferrite. Here, if a carburized layer is formed shallowly, ferrite grains having a small grain diameter may be formed in the microstructure of the decarburized layer. When the ferrite grain diameter is small, in comparison with the case where the ferrite grain diameter is large, the ultrasonic waves that reflect and/or diffract at grain boundaries of ferrite grain will decrease. Thus, ultrasonic waves become less likely diffract within a decarburized layer so that the intensity of the ultrasonic waves that reach a defect will increase. As a result, it is considered that the SN ratio in ultrasonic inspection increases, thus improving the accuracy of ultrasonic inspection of the seamless steel pipe.

Therefore, the seamless steel pipe according to the present embodiment includes a base material having the above described chemical composition and the above described mechanical properties, and a decarburized layer formed on the surface of the base material, in which the depth of the decarburized layer is 150 μm or less. If the depth of the decarburized layer is 150 μm or less, it is possible to improve the accuracy of ultrasonic inspection of a seamless steel pipe even if a decarburized layer is formed in the outer layer of the seamless steel pipe. Note that a yield ratio herein means a ratio of yield strength with respect to tensile strength (that is, yield ratio YR (%)=Yield strength YS/tensile strength TS).

The seamless steel pipe according to the present embodiment which has been completed based on the findings described so far includes a base material, and a decarburized layer formed on the surface of the base material. The chemical composition of the base material consists of, in mass %, C: 0.20 to 0.50%, Si: 0.05 to 0.50%, Mn: 0.01 to 1.00%, P: 0.0300% or less, S: 0.0100% or less, Al: 0.005 to 0.100%, Cr: 0.30 to 1.20%, Mo: 0.30 to 1.50%, Ti: 0.002 to 0.050%, V: 0.01 to 0.30%. Nb: 0.002 to 0.100%. B: 0.0001 to 0.0050%, N: 0.0100% or less, O: 0.0050% or less, Ca: 0 to 0.0100%, Mg: 0 to 0.0100%, Zr: 0 to 0.0100%, rare earth metal: 0 to 0.0100%, Co: 0 to 0.50%, W: 0 to 0.50%, Cu: 0 to 0.50%, and Ni: 0 to 0.50%, with the balance being Fe and impurities. The yield strength of the base material is 655 MPa or more, and the yield ratio of the base material is 85.0% or more. The decarburized layer has a depth of 150 μm or less.

The seamless steel pipe according to the present embodiment has excellent SSC resistance and can achieve excellent accuracy of ultrasonic inspection.

The aforementioned chemical composition may contain one or more types of element selected from the group consisting of Ca: 0.0001 to 0.0100%, Mg: 0.0001 to 0.0100%, Zr: 0.0001 to 0.0100% and rare earth metal: 0.0001 to 0.0100%.

The aforementioned chemical composition may contain one or more types of element selected from the group consisting of Co: 0.02 to 0.50% and W: 0.02 to 0.50%.

The aforementioned chemical composition may contain one or more types of element selected from the group consisting of Cu: 0.02 to 0.50%, and Ni: 0.02 to 0.50%.

The aforementioned decarburized layer may have a depth of 130 μm or less.

The aforementioned seamless steel pipe may be an oil-well steel pipe.

In the present description, the oil-well steel pipe may be a steel pipe that is used for a line pipe or may be a steel pipe used for oil country tubular goods (OCTG). The oil country tubular goods are, for example, seamless steel pipes that are used as casing pipes or tubing pipes.

The seamless steel pipe according to the present embodiment is described in detail. The symbol "%" in relation to an element means "mass percent" unless specifically stated otherwise.

[Configuration of Seamless Steel Pipe]

A seamless steel pipe according to the present embodiment includes a base material and a decarburized layer formed on the surface of the base material.

[Chemical Composition of Base Material]

The chemical composition of the base material constituting the seamless steel pipe according to the present embodiment contains the following elements.

C: 0.20 to 0.50%

Carbon (C) enhances the hardenability of the steel material and increases the yield strength of the steel material. C also promotes spheroidization of carbides during tempering in the production process, and increases the SSC resistance of the steel material. If the carbides are dispersed, the yield strength of the steel material increases further. If the C content is too low, the effects cannot be obtained. On the other hand, if the C content is too high, the toughness of the steel material will decrease and quench cracking is liable to occur. Therefore, the C content is within a range of 0.20 to 0.50%. A preferable lower limit of the C content is 0.22%, more preferably is 0.24%, and further preferably is 0.25%. A preferable upper limit of the C content is 0.48%, more preferably is 0.45%, and further preferably is 0.40%.

Si: 0.05 to 0.50%

Silicon (Si) deoxidizes the steel. If the Si content is too low, the effect cannot be obtained. On the other hand, if the Si content is too high, the SSC resistance of the steel material decreases. If the Si content is too high, in some cases the decarburized layer is formed deeply, the accuracy during ultrasonic inspection deteriorates. Therefore, the Si content is within a range of 0.05 to 0.50%. A preferable lower limit of the Si content is 0.08%, and more preferably is 0.10%. A preferable upper limit of the Si content is 0.48%, more preferably is 0.46%, and further preferably is 0.44%.

Mn: 0.01 to 1.00%

Manganese (Mn) deoxidizes the steel. Mn also enhances the hardenability of the steel material and increases the yield strength of the steel material. If the Mn content is too low, the effects cannot be obtained. On the other hand, if the Mn content is too high, Mn segregates at grain boundaries together with impurities such as P and S. In such a case, the SSC resistance of the steel material will decrease. Therefore, the Mn content is within a range of 0.01 to 1.00%. A preferable lower limit of the Mn content is 0.02%, more preferably is 0.03%, and further preferably is 0.10%. A preferable upper limit of the Mn content is 0.98%, and more preferably is 0.95%.

P: 0.0300% or Less

Phosphorous (P) is an impurity. In other words, the P content is more than 0%. P segregates at the grain boundaries and decreases the SSC resistance of the steel material. Therefore, the P content is 0.0300% or less. A preferable upper limit of the P content is 0.0250%, and more preferably is 0.0200%. Preferably, the P content is as low as possible. However, if the P content is excessively reduced, the production cost increases significantly. Therefore, when taking industrial production into consideration, a preferable lower limit of the P content is 0.0001%, and more preferably is 0.0003%.

S: 0.0100% or Less

Sulfur (S) is an impurity. In other words, the S content is more than 0%. S segregates at the grain boundaries and decreases the SSC resistance of the steel material. Therefore, the S content is 0.0100% or less. A preferable upper limit of the S content is 0.0095%, more preferably is 0.0090%, and further preferably is 0.0085%. Preferably, the S content is as low as possible. However, if the S content is excessively reduced, the production cost increases significantly. Therefore, when taking industrial production into consideration, a preferable lower limit of the S content is 0.0001%, and more preferably is 0.0003%.

Al: 0.005 to 0.100%

Aluminum (Al) deoxidizes the steel. If the Al content is too low, the effect cannot be obtained. On the other hand, if the Al content is too high, coarse oxide-based inclusions are formed and the SSC resistance of the steel material decreases. Therefore, the Al content is within a range of 0.005 to 0.100%. A preferable lower limit of the Al content is 0.015%, and more preferably is 0.020%. A preferable upper limit of the Al content is 0.095%, more preferably is 0.090%, and further preferably is 0.085%. In the present description, the "Al" content means "acid-soluble Al", that is, the content of "sol. Al".

Cr: 0.30 to 1.20%

Chromium (Cr) increases temper softening resistance and enables high-temperature tempering, thus increasing the SSC resistance of steel material. If the Cr content is too low, the effect cannot be obtained. If the Cr content is too low, in some cases the decarburized layer is formed deeply, the accuracy during ultrasonic inspection deteriorates. On the other hand, if the Cr content is too high, coarse carbides form in the steel material and the SSC resistance of the steel material decreases. Therefore, the Cr content is within a range of 0.30 to 1.20%. A preferable lower limit of the Cr content is 0.32%, more preferably is 0.35%, and further preferably is 0.40%. A preferable upper limit of the Cr content is 1.15%, more preferably is 1.10%, and further preferably is 1.05%.

Mo: 0.30 to 1.50%

Molybdenum (Mo) increases temper softening resistance and enables high-temperature tempering, thus increasing the SSC resistance of steel material. If the Mo content is too low, the effect cannot be obtained. On the other hand, if the Mo content is too high, coarse carbides form in the steel material, and the SSC resistance of the steel material decreases. Therefore, the Mo content is within a range of 0.30 to 1.50%. A preferable lower limit of the Mo content is 0.35%, and more preferably is 0.40%. A preferable upper limit of the Mo content is 1.45%, and more preferably is 1.40%.

Ti: 0.002 to 0.050%

Titanium (Ti) forms nitrides, and refines crystal grains by the pinning effect. As a result, the yield strength of the steel material increases. If the Ti content is too low, the effect cannot be obtained. On the other hand, if the Ti content is too high, a large amount of Ti nitrides are formed, and the SSC resistance of the steel material decreases. Therefore, the Ti content is within a range of 0.002 to 0.050%. A preferable lower limit of the Ti content is 0.003%, and more preferably is 0.004%. A preferable upper limit of the Ti content is 0.040%, more preferably is 0.030%, and further preferably is 0.020%.

V: 0.01 to 0.30%

Vanadium (V) increases temper softening resistance and enables high-temperature tempering, thus increasing the SSC resistance of the steel material. Further, V combines with C and/or N to form carbides, nitrides, or carbo-nitrides (hereinafter, referred to as "carbo-nitrides, and the like"). The carbo-nitrides and the like refine the substructure of the steel material by the pinning effect, and increase the SSC resistance of the steel material. Further, V combines with C and forms fine carbides. As a result, the yield strength of the steel material increases. If the V content is too low, the effects cannot be obtained. On the other hand, if the V content is too high, the toughness of the steel material decreases. Therefore, the V content is within a range of 0.01 to 0.30%. A preferable lower limit of the V content is 0.03%, more preferably is 0.05%, and further preferably is 0.07%. A preferable upper limit of the V content is 0.25%, more preferably is 0.20%, and further preferably is 0.15%.

Nb: 0.002 to 0.100%

Niobium (Nb) combines with C and/or N to form carbo-nitrides and the like. The carbo-nitrides and the like refine the substructure of the steel material by the pinning effect, and improve the SSC resistance of the steel material. Nb also combines with C to form fine carbides. As a result, the yield strength of the steel material increases. If the Nb content is too low, the effects cannot be obtained. On the other hand, if the Nb content is too high, carbo-nitrides and the like are excessively formed and the SSC resistance of the steel material decreases. Therefore, the Nb content is within a range of 0.002 to 0.100%. A preferable lower limit of the Nb content is 0.003%, more preferably is 0.005%, and further preferably is 0.010%. A preferable upper limit of the Nb content is 0.095%, more preferably is 0.090%, and further preferably is 0.080%.

B: 0.0001 to 0.0050%

Boron (B) dissolves in a steel material to increase hardenability of the steel material and increases the yield strength of the steel material. If the B content is too low, the effect cannot be obtained. On the other hand, if the B content is too high, coarse nitrides form in the steel material and the SSC resistance of the steel material decreases. Therefore, the B content is within a range of 0.0001 to 0.0050%. A preferable lower limit of the B content is 0.0003%, more preferably is 0.0005%, and further preferably is 0.0012%. A preferable upper limit of the B content is 0.0045%, more preferably is 0.0040%, and further preferably is 0.0035%.

N: 0.0100% or Less

Nitrogen (N) is unavoidably contained. In other words, the N content is more than 0%. N combines with Ti to form nitride, and refines crystal grains by the pinning effect. As a result, the yield strength of the steel material increases. On the other hand, if the N content is too high, coarse nitrides are formed, and the SSC resistance of the steel material decreases. Therefore, the N content is 0.0100% or less. A preferable upper limit of the N content is 0.0090%, and more preferably is 0.0080%. A preferable lower limit of the N content to effectively obtain the above effect is 0.0005%, more preferably is 0.0010%, further preferably is 0.0015%, and further preferably is 0.0020%.

O: 0.0050% or Less

Oxygen (O) is an impurity. In other words, the O content is more than 0%. O forms coarse oxides and decreases the SSC resistance of the steel material. Therefore, the O content is 0.0050% or less. A preferable upper limit of the O content is 0.0048%, and more preferably is 0.0045%. Preferably, the O content is as low as possible. However, if the O content is excessively reduced, the production cost increases significantly. Therefore, when taking industrial production into consideration, a preferable lower limit of the O content is 0.0001%, and more preferably is 0.0003%.

The balance of the chemical composition of the steel material according to the present embodiment is Fe and impurities. Here, the term "impurities" refers to elements which, during industrial production of the steel material, are mixed in from ore or scrap that is used as a raw material of the steel material, or from the production environment or the like, and which are allowed within a range that does not adversely affect the steel material according to the present embodiment.

[Regarding Optional Elements]

The chemical composition of the steel material described above may further contain one or more types of element selected from the group consisting of Ca, Mg, Zr and rare earth metal (REM) in lieu of a part of Fe. Each of these elements is an optional element and renders S in the steel material harmless by forming sulfides, and increases the SSC resistance of the steel material.

Ca: 0 to 0.0100%

Calcium (Ca) is an optional element, and need not be contained. In other words, the Ca content may be 0%. If contained, Ca renders S in the steel material harmless by forming sulfides, and increases the SSC resistance of the steel material. If even a small amount of Ca is contained, the effect can be obtained to a certain extent. However, if the Ca content is too high, oxides in the steel material coarsen and the SSC resistance of the steel material decreases. Therefore, the Ca content is within a range of 0 to 0.0100%. A preferable lower limit of the Ca content is more than 0%, more preferably is 0.0001%, further preferably is 0.0003%, and further preferably is 0.0006%. A preferable upper limit of the Ca content is 0.0060%, more preferably is 0.0050%, and further preferably is 0.0030%.

Mg: 0 to 0.0100%

Magnesium (Mg) is an optional element, and need not be contained. In other words, the Mg content may be 0%. If contained, Mg renders S in the steel material harmless by forming sulfides, and increases the SSC resistance of the steel material. If even a small amount of Mg is contained, the effect can be obtained to a certain extent. However, if the Mg content is too high, oxides in the steel material coarsen and the SSC resistance of the steel material decreases. Therefore, the Mg content is within a range of 0 to 0.0100%. A preferable lower limit of the Mg content is more than 0%, more preferably is 0.0001%, further preferably is 0.0003%, and further preferably is 0.0006%. A preferable upper limit of the Mg content is 0.0060%, more preferably is 0.0050%, and further preferably is 0.0030%.

Zr: 0 to 0.0100%

Zirconium (Zr) is an optional element, and need not be contained. In other words, the Zr content may be 0%. If contained, Zr renders S in the steel material harmless by forming sulfides, and increases the SSC resistance of the steel material. If even a small amount of Zr is contained, the effect can be obtained to a certain extent. However, if the Zr content is too high, oxides in the steel material coarsen and the SSC resistance of the steel material decreases. Therefore, the Zr content is within a range of 0 to 0.0100%. A preferable lower limit of the Zr content is more than 0%, more preferably is 0.0001%, further preferably is 0.0003%, and further preferably is 0.0006%. A preferable upper limit of the Zr content is 0.0060%, more preferably is 0.0050%, and further preferably is 0.0030%.

Rare Earth Metal (REM): 0 to 0.0100%

Rare earth metal (REM) is an optional element, and need not be contained. In other words, the REM content may be 0%. If contained, REM renders S in the steel material harmless by forming sulfides, and increases the SSC resistance of the steel material. REM also combines with P in the steel material and suppresses segregation of P at the crystal grain boundaries. Therefore, a decrease in low-temperature toughness and in the SSC resistance of the steel material that is attributable to segregation of P is suppressed. If even a small amount of REM is contained, the effects can be obtained to a certain extent. However, if the REM content is too high, oxides coarsen and the low-temperature toughness and SSC resistance of the steel material decrease. Therefore, the REM content is within a range of 0 to 0.0100%. A preferable lower limit of the REM content is more than 0%, more preferably is 0.0001%, further preferably is 0.0003%, and further preferably is 0.0006%. A preferable upper limit of the REM content is 0.0060%, more preferably is 0.0050%, and further preferably is 0.0030%.

Note that, in the present description the term "REM" refers to one or more types of element selected from the group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. Further, in the present description the term "REM content" refers to the total content of these elements.

The chemical composition of the steel material described above may further contain one or more types of element selected from the group consisting of Co and W in lieu of a part of Fe. Each of these elements is an optional element that forms a protective corrosion coating in a sour environment and suppresses hydrogen penetration. By this means, each of these elements increases the SSC resistance of the steel material.

Co: 0 to 0.50%

Cobalt (Co) is an optional element, and need not be contained. In other words, the Co content may be 0%. If contained, Co forms a protective corrosion coating in a sour environment and suppresses hydrogen penetration. As a result, the SSC resistance of the steel material increases. If even a small amount of Co is contained, the effect can be obtained to a certain extent. However, if the Co content is too high, the hardenability of the steel material will decrease, and the yield strength of the steel material will decrease. Therefore, the Co content is within a range of 0 to 0.50%. A preferable lower limit of the Co content is more than 0%, more preferably is 0.02%, further preferably is 0.03%, and further preferably is 0.05%. A preferable upper limit of the Co content is 0.45%, and more preferably is 0.40%.

W: 0 to 0.50%

Tungsten (W) is an optional element, and need not be contained. In other words, the W content may be 0%. If contained, W forms a protective corrosion coating in a sour environment and suppresses hydrogen penetration. As a result, the SSC resistance of the steel material increases. If even a small amount of W is contained, the effect can be obtained to a certain extent. However, if the W content is too high, course carbides form in the steel material and the SSC resistance of the steel material decreases. Therefore, the W content is within a range of 0 to 0.50%. A preferable lower limit of the W content is more than 0%, more preferably is 0.02%, further preferably is 0.03%, and further preferably is 0.05%. A preferable upper limit of the W content is 0.45%, and more preferably is 0.40%.

The chemical composition of the steel material described above may further contain one or more types of element selected from the group consisting of Cu and Ni in lieu of a part of Fe. Each of these elements is an optional element, and enhances the hardenability of the steel material and increases the SSC resistance of the steel material.

Cu: 0 to 0.50%

Copper (Cu) is an optional element and may not be contained. In other words, the Cu content may be 0%. If contained, Cu enhances the hardenability of the steel material to increase the yield strength of the steel material. If even a small amount of Cu is contained, the effect can be obtained to a certain extent. On the other hand, if the Cu content is too high, the hardenability of the steel material will be too high and the SSC resistance of the steel material will decrease. Therefore, the Cu content is 0 to 0.50%. A preferable lower limit of the Cu content is more than 0%, more preferably is 0.02%, further preferably is 0.03%, and further preferably is 0.05%. A preferable upper limit of the Cu content is 0.40%, more preferably is 0.30%, further preferably is 0.20%, and further preferably is 0.15%.

Ni: 0 to 0.50%

Nickel (Ni) is an optional element and may not be contained. In other words, the Ni content may be 0%. If contained, Ni enhances the hardenability of the steel material and increases the yield strength of the steel material. If even a small amount of Ni is contained, the effect can be obtained to a certain extent. On the other hand, if the Ni content is too high, the Ni will promote local corrosion and the SSC resistance of the steel material will decrease. Therefore, the Ni content is 0 to 0.50%. A preferable lower limit of the Ni content is more than 0%, more preferably is 0.02%, further preferably is 0.05%, and further preferably is 0.10%. A preferable upper limit of the Ni content is 0.40%, more preferably is 0.30%, further preferably is 0.20%, and further preferably is 0.15%.

[Yield Strength and Yield Ratio of Base Material]

A base material which constitutes a seamless steel pipe according to the present embodiment has a yield strength of 655 MPa or more, and a yield ratio of the base material is 85.0% or more. In short, the seamless steel pipe according to the present embodiment is of 95 ksi or more. As a result of that the base material constituting the seamless steel pipe according to the present embodiment has the above described chemical composition, a yield strength of 655 MPa or more, and a yield ratio of 85.0% or more, the seamless steel pipe of the present embodiment has a yield strength of 655 MPa or more and excellent SSC resistance.

Note that, an upper limit of a yield strength of a seamless steel pipe according to the present embodiment is not particularly limited. Meanwhile, at least when a yield strength is within a range of 655 to 965 MPa, it has been proved by examples described later that a seamless steel pipe according to the present embodiment has excellent SSC resistance and excellent accuracy of ultrasonic inspection. Accordingly, a yield strength of the seamless steel pipe according to the present embodiment includes at least 655 to 965 MPa (95 to 140 ksi). In other words, a yield strength of the seamless steel pipe according to the present embodiment includes at least 655 to less than 758 MPa (95 ksi grade), 758 to less than 862 MPa (110 ksi grade) and 862 to 965 MPa (125 ksi grade).

In the present description, the yield strength of the base material of the seamless steel pipe according to the present embodiment is defined in accordance with API 5CT (2011).

Specifically, in a case where the base material according to the present embodiment has a yield strength within a range of 655 to less than 758 MPa (95 ksi grade), the yield strength means a stress at a time of 0.5% total elongation (0.5% proof stress) obtained in a tensile test. In a case where the base material according to the present embodiment has a yield strength within a range of 758 MPa or more (110 ksi or more), the yield strength means a stress at a time of 0.7% total elongation (0.7% proof stress) obtained in a tensile test. Also, in the present description, a yield ratio is defined as a ratio of the tensile strength to the yield strength. Here, the upper limit of the yield ratio according to the present embodiment is not particularly limited, and for example, may be 100.0%. Note that, in the present description, a tensile strength of the base material is defined as the maximum stress during uniform elongation in a tensile test.

The yield strength and yield ratio of the base material constituting the seamless steel pipe according to the present embodiment can be determined by the following method. A tensile test is conducted by a method in conformity with ASTM E8/E8M (2013). A round bar test specimen is taken from a seamless steel pipe according to the present embodiment. Specifically, a round bar test specimen is taken from a center portion of the wall thickness. The size of a round bar test specimen is, for example, 4 mm in the parallel portion diameter and 35 mm in the parallel portion length. Note that the axial direction of the round bar test specimen is parallel with the pipe axis direction of the seamless steel pipe. A tensile test is performed at a normal temperature (25° C.) in the atmosphere by using the round bar test specimen.

In a case where the obtained stress at the time of 0.5% total elongation (0.5% proof stress) is within the range of 655 to less than 758 MPa (95 ksi grade), the 0.5% proof stress is used as the yield strength (MPa). In a case where the obtained stress at the time of 0.7% elongation (0.7% proof stress) is within the range of 758 MPa or more (110 ksi or more), the 0.7% proof stress is used as the yield strength (MPa). Also, the obtained maximum stress during uniform elongation in the tensile test is used as the tensile strength (MPa). Further, a ratio of the tensile strength (TS) to the yield strength (YS) is used as the yield ratio (YR) (%) (yield ratio YR=yield strength YS/tensile strength TS).

[Microstructure of Base Material]

The microstructure of the base material, the total of volume ratios of tempered martensite and tempered bainite is 90% or more. The balance of the microstructure is, for example, ferrite or pearlite. In the present embodiment, if the yield strength of the base material which satisfies the above described chemical composition is 655 MPa or more (95 ksi or more), and the yield ratio is 85.0% or more, the microstructure of the base material is considered to contain 90% or more in total of volume ratios of tempered martensite and tempered bainite. Preferably, the microstructure of the base material is composed only of tempered martensite and/or tempered bainite.

In the field of alloys, the mechanical properties depend on the microstructure (phases, precipitates, and inclusions), and/or the crystal structure of metal crystal, and/or the atomic arrangement of a seamless steel pipe, and further on the balance of these. For that reason, a person skilled in the art will be able to identify the microstructure from the chemical composition, yield strength, and yield ratio of a seamless steel pipe.

Note that the total of volume ratios of tempered martensite and tempered bainite can be determined by microstructure observation as well. A test specimen having an observation surface with dimensions of 10 mm in the pipe axis direction and 10 mm in the pipe radial direction is cut out from a center portion of the wall thickness of a seamless steel pipe. After being polished to be a mirror surface, the observation surface is immersed in a 2% nital etching reagent for about 10 seconds to reveal the structure by etching. The etched observation surface is observed in 10 visual fields in a bright-field image by using an optical microscope. The area of each visual field is, for example, 2000 $\mu m^2$ (magnification of 500 times).

In each visual field, the tempered martensite and tempered bainite can be discriminated from other phases (for example, ferrite or pearlite) based on contrast. Therefore, in each visual field, tempered martensite and tempered bainite are identified. A total of area factions of identified tempered martensite and tempered bainite is determined. In the present embodiment, an arithmetic average value of the totals of area fractions of tempered martensite and tempered bainite, which are determined in all the visual fields, is defined as a volume ratio (%) of tempered martensite and tempered bainite.

[Decarburized Layer]

The seamless steel pipe according to the present embodiment further includes a decarburized layer formed on the surface of the above described base material. The decarburized layer constituting the seamless steel pipe according to the present embodiment has a depth of 150 µm or less. As so far described, the decarburized layer constituting the seamless steel pipe according to the present embodiment is a layer with a decreased C content formed as a result of a surface portion of the seamless steel pipe being oxidized.

As described above, the decarburized layer has a decreased C content. For that reason, the microstructure of the decarburized layer is principally composed of ferrite. Specifically, the microstructure of the decarburized layer is composed of, in volume ratio, 90% or more of ferrite. The balance of the microstructure of the decarburized layer is, for example, precipitates and inclusions. On the other hand, as described above, the chemical composition of the base material constituting the seamless steel pipe according to the present embodiment has a C content of 0.20 to 0.50%. Therefore, there is difference in the C content between the decarburized layer and the base material in their chemical compositions. As a result, in the seamless steel pipe according to the present embodiment, ultrasonic waves are likely to reflect and/or diffract at an interface between the base material and the decarburized layer during ultrasonic inspection. In other words, in the seamless steel pipe according to the present embodiment, accuracy of ultrasonic inspection is likely to deteriorate.

As described above, the seamless steel pipe according to the present embodiment is likely to decrease the accuracy of ultrasonic inspection because of the chemical composition. For that reason, in the seamless steel pipe according to the present embodiment, the depth of the decarburized layer which is formed in the outer layer of the seamless steel pipe is kept small. When the decarburized layer constituting the seamless steel pipe according to the present embodiment is formed to be deeper than 150 µm, ultrasonic waves that diffract within the decarburized layer during ultrasonic inspection increase. As a result, the accuracy of ultrasonic inspection deteriorates. Therefore, the decarburized layer constituting the seamless steel pipe according to the present embodiment has a depth of 150 µm or less.

A preferable upper limit of the depth of the decarburized layer is 140 µm, more preferably is 130 µm, further preferably is 120 µm, and further preferably is 110 µm. If the depth of the decarburized layer is 130 µm or less, the accuracy of ultrasonic inspection is further improved. On the other hand, the lower limit of the depth of the decarburized layer will not be particularly limited. However, in the seamless steel pipe according to the present embodiment, the decarburized layer will be formed to be about 15 µm, from the nature of their production process. For that reason, the lower limit of the depth of the decarburized layer of the seamless steel pipe according to the present embodiment is substantially 15 µm.

The depth of the decarburized layer of the seamless steel pipe according to the present embodiment can be determined by a method in conformity with JIS G 0558 (2007). A test specimen for the observation of decarburized layer is taken from the seamless steel pipe according to the present embodiment. Specifically, a test specimen which includes the surface of the seamless steel pipe according to the present embodiment and has an observation surface with dimensions of 10 mm in the pipe axis direction and 10 mm in the pipe radial direction is taken. The surface of the seamless steel pipe may be either the outer surface or the inner surface. Note that, in a case where the seamless steel pipe has a wall thickness of less than 10 mm, a test specimen having an observation surface with dimensions of 10 mm in the pipe axis direction and a wall thickness of the seamless steel pipe in the pipe radial direction is taken. After the observation surface of the test specimen is polished to be a mirror surface, the test specimen is immersed in a 2% nital etching reagent for about 10 seconds to reveal the microstructure thereof by etching. The etched observation surface is observed in 10 visual fields in a bright-field image by using an optical microscope. The area of each visual field is, for example, 0.1 mm$^2$ (magnification of 200 times).

As described above, in the present embodiment, the microstructure of the base material is composed of, in volume ratio, 90% or more of tempered martensite and/or tempered bainite. On the other hand, the microstructure of the decarburized layer is composed of, in volume ratio, 90% or more of ferrite. Further, as described above, in each visual field, the tempered martensite and tempered bainite can be discriminated from ferrite based on contrast. Therefore, ferrite is identified in each visual field based on contrast. In each visual field, a region which includes 90% or more of the identified ferrite is defined as the decarburized layer. In each visual field, a position where the decarburized layer is formed to deepest is identified. The depth of the decarburized layer at the identified position is determined. An arithmetic average value of the depths of the decarburized layer which are determined in all the visual fields is defined as the depth (µm) of decarburized layer.

[SSC Resistance of Seamless Steel Pipe]

In a seamless steel pipe according to the present embodiment, excellent SSC resistance is defined for each range of yield strength. Note that, the SSC resistance of the seamless steel pipe according to the present embodiment can be evaluated by a method in conformity with Method A specified in NACE TM0177-2005 without regard to the range of yield strength.

[SSC Resistance when Yield Strength is 655 to Less than 758 MPa]

In a case where the yield strength is 655 to less than 758 MPa (95 to less than 110 ksi, 95 ksi grade), the SSC resistance of the seamless steel pipe can be evaluated by a following method. A mixed aqueous solution containing 5.0 mass % of sodium chloride and 0.5 mass % of acetic acid (NACE solution A) is used as the test solution. A round bar test specimen is taken from a center portion of the wall thickness of the seamless steel pipe according to the present embodiment. The size of the round bar test specimen is, for example, 6.35 mm in the diameter and 25.4 mm in the length of the parallel portion. Note that the axial direction of the round bar test specimen is parallel with the pipe axis direction of the seamless steel pipe.

Stress corresponding to 90% of the actual yield stress of the base material is applied to the round bar test specimen. A test solution of 24° C. is poured into a test vessel such that the round bar test specimen under applied stress is immersed, thereby providing a test bath. After the test bath is degassed, 1 atm of $H_2S$ gas is blown thereinto to make the test bath a corrosive environment. The test bath in which the round bar test specimen is immersed is held at 24° C. for 720 hours. In the present embodiment, in a case where the yield strength is 655 to less than 758 MPa, if no crack is confirmed after elapse of 720 hours under the above described condition, it is determined that the seamless steel pipe has excellent SSC resistance. In other words, in a seamless steel pipe according to the present embodiment in a case where the yield strength is 655 to less than 758 MPa, no crack is confirmed after elapse of 720 hours under the above described condition. Note that "no crack is confirmed" as used herein means that no crack is confirmed in the test specimen when the test specimen after testing is observed with the naked eye.

[SSC Resistance when Yield Strength is 758 to Less than 862 MPa]

In a case where the yield strength is 758 to less than 862 MPa (110 to less than 125 ksi, 110 ksi grade), the SSC resistance of the seamless steel pipe can be evaluated by a following method. A mixed aqueous solution containing 5.0 mass % of sodium chloride and 0.5 mass % of acetic acid (NACE solution A) is used as the test solution. A round bar test specimen is taken from a center portion of the wall thickness of the seamless steel pipe according to the present embodiment. The size of the round bar test specimen is, for example, 6.35 mm in the diameter and 25.4 mm in the length of the parallel portion. Note that the axial direction of the round bar test specimen is parallel with the pipe axis direction of the seamless steel pipe.

Stress corresponding to 90% of the actual yield stress of the base material is applied to the round bar test specimen. A test solution of 24° C. is poured into a test vessel such that the round bar test specimen under applied stress is immersed, thereby providing a test bath. After the test bath is degassed, 1 atm of $H_2S$ gas is blown thereinto to make the test bath a corrosive environment. The test bath in which the round bar test specimen is immersed is held at 24° C. for 720 hours. In the present embodiment, in a case where the yield strength is 758 to less than 862 MPa, if no crack is confirmed after elapse of 720 hours under the above described condition, it is determined that the seamless steel pipe has excellent SSC resistance. In other words, in a seamless steel pipe according to the present embodiment in a case where the yield strength is 758 to less than 862 MPa, no crack is confirmed after elapse of 720 hours under the above described condition. Note that "no crack is confirmed" as used herein means that no crack is confirmed in the test specimen when the test specimen after testing is observed with the naked eye.

[SSC Resistance when Yield Strength is 862 MPa or More]

In a case where the yield strength is 862 MPa or more (125 ksi or more), the SSC resistance of the seamless steel pipe can be evaluated by a following method. A mixed aqueous solution containing 5.0 mass % of sodium chloride, 0.41 mass % of sodium acetate and 2.5 mass % of acetic acid (NACE solution B) is used as the test solution. A round bar test specimen is taken from a center portion of the wall thickness of the seamless steel pipe according to the present embodiment. The size of the round bar test specimen is, for example, 6.35 mm in the diameter and 25.4 mm in the length of the parallel portion. Note that the axial direction of the round bar test specimen is parallel with the pipe axis direction of the seamless steel pipe.

Stress corresponding to 90% of the actual yield stress of the base material is applied to the round bar test specimen. A test solution of 24° C. is poured into a test vessel such that the round bar test specimen under applied stress is immersed, thereby providing a test bath. After the test bath is degassed, a mixed gas of 0.1 atm of $H_2S$ gas and 0.9 atm of $CO_2$ gas is blown thereinto to make the test bath a corrosive environment. The test bath in which the round bar test specimen is immersed is held at 24° C. for 720 hours. In the present embodiment, in a case where the yield strength is 862 MPa or more, if no crack is confirmed after elapse of 720 hours under the above described condition, it is determined that the seamless steel pipe has excellent SSC resistance. In other words, in a seamless steel pipe according to the present embodiment in a case where the yield strength is at least 862 to 965 MPa, no crack is confirmed after elapse of 720 hours under the above described condition. Note that "no crack is confirmed" as used herein means that no crack is confirmed in the test specimen when the test specimen after testing is observed with the naked eye.

[Production Method]

A method for producing the seamless steel pipe according to the present embodiment will now be described. An example of the method for producing a seamless steel pipe according to the present embodiment includes a process of preparing a hollow shell (preparation process), and a process of performing quenching and tempering on the hollow shell to make a seamless steel pipe (quenching process and tempering process). The preparation process may include a process of preparing a starting material (starting material preparation process) and a process of performing hot working on the starting material to produce the hollow shell (hot working process). Hereinafter, each process will be described in detail.

[Preparation Process]

In the preparation process, a hollow shell having the aforementioned chemical composition is prepared. If the hollow shell has the aforementioned chemical composition, the process of preparing the hollow shell will not be particularly limited. In other words, the preparation process may include the process of preparing a starting material (starting material preparation process), and the process of performing hot working of the starting material to produce the hollow shell (hot working process). Hereunder, a case in which the preparation process includes the starting material preparation process and the hot working process is described in detail.

[Starting Material Preparation Process]

In the starting material preparation process, a starting material is produced using molten steel having the aforementioned chemical composition. Specifically, a cast piece (slab, bloom or billet) is produced by a continuous casting process using the molten steel having the aforementioned chemical composition. An ingot may also be produced by an ingot-making process using the molten steel having the aforementioned chemical composition. As necessary, the slab, bloom or ingot may be subjected to blooming to produce a billet. By the above described processes, a starting material (slab, bloom, billet, or ingot) is produced.

[Hot Working Process]

In the hot working process, the starting material that was prepared is subjected to hot working to produce a hollow shell. Specifically, first, the billet is heated in a heating furnace. Although the heating temperature is not particularly limited, for example, the heating temperature is within a range of 1100 to 1300° C. The billet that is extracted from the heating furnace is subjected to hot working to produce a hollow shell (seamless steel pipe). Note that the heating furnace in the hot working process will not be particularly limited. This is because in the heating furnace in the hot working process, since the heating temperature is high, formation of a scale is more likely to occur than formation of a decarburized layer.

For example, a hot rolling such as the Mannesmann process may be performed as the hot working to produce the hollow shell. In this case, first, a round billet is piercing-rolled using a piercing machine. When performing piercing-rolling, although the piercing ratio is not particularly limited, the piercing ratio is, for example, within a range of 1.0 to 4.0. The round billet that underwent piercing-rolling is further hot-rolled to form a hollow shell using a mandrel mill, a reducer, a sizing mill or the like. The cumulative reduction of area in the hot working process is, for example, 20 to 70%.

A hollow shell may also be produced from the starting material by another hot working method. For example, in the case of a heavy-wall steel material of a short length such as a coupling, a hollow shell may be produced by hot forging such as Ehrhardt process. A hollow shell is produced from the starting material by the above process. Although not particularly limited, the wall thickness of the hollow shell is, for example, 9 to 60 mm.

The hollow shell produced by hot working may be air cooled (as-rolled). The hollow shell produced by hot working may be subjected to direct quenching after hot working without being cooled to a normal temperature, or may be subjected to quenching after being subjected to reheating after hot working. However, in the case of performing direct quenching, it is preferable to stop the cooling midway through the quenching process and conduct slow cooling for the purpose of suppressing quench cracking.

In a case where direct quenching is performed after hot working, for the purpose of eliminating residual stress it is preferable to perform a stress relief annealing (SR) at a time that is after quenching and before a heat treatment (tempering or the like) of the next process.

As described above, a hollow shell is prepared in the preparation process. The hollow shell may be produced by the aforementioned preferable process, or may be a hollow shell that was produced by a third party, or a hollow shell that was produced in another factory other than the factory in which a quenching process and a tempering process that are described later are performed, or at a different work.

[Quenching Process]

In the quenching process, the hollow shell that was prepared is subjected to quenching. In the present description, "quenching" means rapidly cooling a hollow shell at a temperature not less than $A_3$ point. In the present description, after performed hot working, rapidly cooling a hollow shell at a temperature not less than $A_3$ point directly or with performed supplementary heating is referred to as a "direct quenching". In the present description, rapidly cooling a hollow shell at a temperature not less than $A_3$ point after performed reheating is referred to as an "off-line quenching". Hereinafter, the off-line quenching and an off-line tempering described below are collectively referred to as an "off-line heat treatment". A preferable quenching temperature is 800 to 1000° C. When direct quenching is performed after hot working, the quenching temperature corresponds to a surface temperature of the hollow shell, which is measured by a thermometer placed at the delivery side of the apparatus for performing final hot working. When quenching is performed by using a supplementary heating furnace or a heat treatment furnace after hot working, the quenching temperature further corresponds to the temperature of the supplementary heating furnace or the heat treatment furnace (hereinafter, the supplementary heating furnace or the heat treatment furnace used for heating before quenching is also referred to simply as a "quenching furnace").

When the quenching temperature is too high, the crystal grain of prior-austenite will become coarse in the seamless steel pipe after tempering and the SSC resistance of the seamless steel pipe may decrease. Therefore, the quenching temperature is preferably 800 to 1000° C. A more preferable upper limit of the quenching temperature is 950° C.

In the quenching process according to the present embodiment, when quenching is performed by using a quenching furnace after hot working, the temperature inside the quenching furnace is controlled by combusting a flammable gas. In the present description, the flammable gas includes, for example, hydrocarbon gas (methane, ethane, propane, butane, ethylene, or the like), hydrogen, carbon monoxide, or the like.

Here, when the flammable gas is combusted, an amount of oxygen more than the amount required for the flammable gas to undergo complete combustion is provided. This is for the purpose of preventing incomplete combustion. On the other hand, in the quenching process according to the present embodiment, atmospheric gas of the quenching furnace is gas after combustion, which is obtained by combusting a flammable gas. In other words, as a result of providing an excessive amount of oxygen to combust the flammable gas, a certain amount of oxygen will remain in the quenching furnace.

As described above, the chemical composition of the hollow shell according to the present embodiment has a high carbon content. Further, the temperature inside the quenching furnace is 800 to 1000° C. As a result, the oxygen remaining in the quenching furnace combines with carbon in the surface portion of the hollow shell to generate carbon dioxide gas. According to this mechanism, a decarburized layer is formed in the surface portion of the hollow shell according to the present embodiment. For that reason, in the quenching process according to the present embodiment, the oxygen concentration in the atmospheric gas within the quenching furnace, which is generated as a result of combusting a flammable gas, is reduced. More specifically, in the quenching process according to the present embodiment, the oxygen concentration in the atmospheric gas in the quenching furnace is adjusted to be 1 to 8% in volume fraction excepting water vapor.

If the oxygen concentration of the atmospheric gas in the quenching furnace is more than 8% in volume fraction excepting water vapor, there may be a case in which excessive decarburization progresses during quenching and the depth of the decarburized layer of the seamless steel pipe after quenching and tempering becomes excessively large. On the other hand, if the oxygen concentration in the atmospheric gas in the quenching furnace is less than 1% in volume fraction excepting water vapor, there may be a case in which the flammable gas undergoes incomplete combustion. Therefore, in the quenching process according to the present embodiment, the oxygen concentration of the atmospheric gas in the quenching furnace is set within a range of 1 to 8% in volume fraction excepting water vapor. A preferable upper limit of the oxygen concentration of the atmospheric gas in the quenching furnace in the volume fraction excepting water vapor is 7%. A preferable lower limit of the oxygen concentration of the atmospheric gas in the quenching furnace is 2%, and more preferably is 3%.

The oxygen concentration of the atmospheric gas in the quenching furnace can be controlled by, for example, mixing and combusting a flammable gas with air. Specifically, the amount of oxygen which is required for completely combusting the flammable gas can be determined by calculation from a chemical formula of the flammable gas. Further, the oxygen concentration before combustion can be adjusted by adjusting the mixing ratio between the flammable gas and air. In this way, the oxygen concentration of the atmospheric gas in the quenching furnace is controlled. Note that a preferable amount of the balance of the atmospheric gas in the quenching furnace will not be particularly limited. However, when, as described above, the flammable gas and air are mixed and combusted, the balance of the atmospheric gas in the quenching furnace is an inert gas principally composed of nitrogen.

Successively, the hollow shell at the quenching temperature is rapidly cooled. In the quenching method, for example, the hollow shell is continuously cooled from the quenching temperature such that the temperature of the hollow shell continuously decreases. The method of performing the continuous cooling treatment is not particularly limited and a well-known method can be used. The method of performing the continuous cooling treatment is, for example, a method that cools the hollow shell by immersing in a water bath, or a method that cools the hollow shell in an accelerated manner by shower water cooling or mist cooling.

If the cooling rate during quenching is too slow, a microstructure principally composed of martensite and bainite will not be obtained. In this case, the seamless steel pipe after quenching and tempering cannot achieve excellent SSC resistance. Therefore, in the method for producing a seamless steel pipe according to the present embodiment, the hollow shell is rapidly cooled during quenching. Specifically, in the quenching process, an average cooling rate when the temperature of the hollow shell is within a range of 800 to 500° C. during quenching is defined as a cooling rate during quenching $CR_{800-500}$ (° C./sec). The cooling rate during quenching $CR_{800-500}$ is determined from the surface temperature of the hollow shell and the time taken for quenching.

A preferable cooling rate during quenching $CR_{800-500}$ is 8° C./sec or more. In this case, the microstructure of the hollow shell after quenching will become principally composed of martensite and bainite in a stable manner. A preferable lower limit of the cooling rate during quenching $CR_{800-500}$ is 00° C./sec. A preferable upper limit of the cooling rate during quenching $CR_{800-500}$ is 500° C./sec.

Note that the quenching process according to the present embodiment may be performed only once. On the other hand, the quenching process according to the present embodiment may be performed multiple times. If the quenching process is performed multiple times, austenite grains will be refined, and thereby the SSC resistance of the seamless steel pipe will be further improved. However, when the quenching process is performed multiple times, there may be a case in which the depth of a decarburized layer of the seamless steel pipe after quenching and tempering becomes excessively deep.

Accordingly, in the quenching process according to the present embodiment, the number of times the quenching process is performed is limited. Specifically, the quenching process according to the present embodiment is performed 1 to 4 times in total. If the number of times the quenching process is performed is zero, the microstructure of the hollow shell will not become one that is principally composed of martensite and bainite. In this case, the seamless steel pipe after quenching and tempering cannot achieve excellent SSC resistance. On the other hand, if the number of times the quenching process is performed is 5 times or more in total, the decarburized layer of the seamless steel pipe after quenching and tempering will be more than 150 µm. In this case, the seamless steel pipe cannot achieve excellent accuracy of ultrasonic inspection.

Therefore, the quenching process according to the present embodiment is performed 1 to 4 times in total. Note that, in all of the quenching process to be repeated, an off-line quenching may be performed. Or, among the quenching process to be repeated, in the first quenching process, a direct quenching may be performed. In this case, the decarburized layer of the seamless steel pipe becomes shallower and further excellent accuracy of ultrasonic inspection can be achieved. Further, in this case, the prior-austenite grain of the seamless steel pipe is refined and further excellent SSC resistance can be achieved. A preferable upper limit of the number of times to repeat the quenching process is 3 times in total. In this case, further excellent accuracy of ultrasonic inspection can be achieved.

In other words, in the quenching process according to the present embodiment, the atmospheric gas in the quenching furnace is controlled as described above, and the quenching process is performed 1 to 4 times in total. This will allow the depth of the decarburized layer constituting the seamless steel pipe according to the present embodiment to fall within a range of 150 µm or less. Note that the above described quenching method is one example, and the depth of the decarburized layer may be controlled in another method. Hereunder, the tempering process will be described in detail.

[Tempering Process]

In the tempering process, tempering is performed on the hollow shell which has been subjected to the aforementioned quenching process. As used in the present description, the term "tempering" means reheating and holding the hollow shell after quenching at a temperature that is not more than the $A_{c1}$ point. In the present description, a tempering performed to be followed by an off-line quenching is referred to as an "off-line tempering". The tempering temperature is appropriately adjusted in accordance with the chemical composition of the steel material and the yield strength to be obtained. In other words, the yield strength of a seamless steel pipe is adjusted by adjusting the tempering temperature for a hollow shell having the chemical composition of the present embodiment. In other words, the seamless steel pipe is adjusted to have a yield strength of 655 MPa or more (95 ksi or more) by adjusting the tempering temperature for a hollow shell having the chemical composition of the present embodiment.

In the present description, the term "tempering temperature" corresponds to the temperature of the furnace (tempering furnace) when the hollow shell after quenching is heated and held. In the tempering process according to the present embodiment, the tempering temperature is adjusted in a case where it is intended to obtain the yield strength. Specifically, in a case where it is intended to obtain a yield strength of 655 to less than 758 MPa (95 ksi grade), a preferable tempering temperature is within the range of 650 to 740° C. In this case, a more preferable lower limit of the tempering temperature is 670° C., and further preferably is 680° C. In this case, a more preferable upper limit of the tempering temperature is 730° C. and further preferably is 720° C.

Also, in a case where it is intended to obtain a yield strength of 758 to less than 862 MPa (110 ksi grade), a preferable tempering temperature is within the range of 650 to 720° C. In this case, a more preferable lower limit of the tempering temperature is 660° C., and further preferably is 670° C. In this case, a more preferable upper limit of the tempering temperature is 715° C., and further preferably is 710° C. Further, in a case where it is intended to obtain a yield strength of 862 to 965 MPa (125 ksi grade), a preferable tempering temperature is within the range of 650 to 720° C. In this case, a more preferable lower limit of the tempering temperature is 660° C., and further preferably is 670° C. In this case, a more preferable upper limit of the tempering temperature is 715° C., and further preferably is 710° C.

In the present description, the term "staying time in the furnace for tempering (tempering time)" means the time period from when the hollow shell is charged into the furnace (tempering furnace), which is used for heating and holding the hollow shell after quenching, until the hollow shell is taken out from the furnace. If the tempering time is too short, the total volume ratio of tempered martensite and tempered bainite may be less than 90% in some cases. In this case, the seamless steel pipe cannot achieve excellent SSC resistance. On the other hand, if the tempering time is too long, the aforementioned effect is saturated. Further, if the tempering time is too long, the desired yield strength may not be obtained in some cases.

Therefore, in the tempering process of the present embodiment, the tempering time is preferably set within a range of 10 to 180 minutes. A more preferable lower limit of the tempering time is 15 minutes. A more preferable upper limit of the tempering time is 120 minutes, and further preferably is 90 minutes. In a seamless steel pipe having the chemical composition of the present embodiment, it is surely possible for a person skilled in the art to adjust the yield strength to be a desired value by appropriately adjusting the above tempering temperature and the above tempering time.

A seamless steel pipe according to the present embodiment can be produced by the production method described so far. Note that the aforementioned production method is one example, and the steel material according to the present embodiment may be produced by another production method.

EXAMPLE

Molten steels containing the chemical compositions shown in Table 1 were produced.

TABLE 1

| Steel | Chemical Composition (in the unit of mass %, the balance being Fe and impurities) | | | | | | | | | | | |
|---|---|---|---|---|---|---|---|---|---|---|---|---|
| | C | Si | Mn | P | S | Al | Cr | Mo | Ti | V | Nb | B |
| A | 0.27 | 0.20 | 0.95 | 0.0032 | 0.0074 | 0.082 | 0.40 | 1.32 | 0.003 | 0.05 | 0.088 | 0.0019 |
| B | 0.33 | 0.11 | 0.19 | 0.0210 | 0.0079 | 0.081 | 0.57 | 0.46 | 0.004 | 0.12 | 0.062 | 0.0030 |
| C | 0.40 | 0.50 | 0.42 | 0.0039 | 0.0028 | 0.091 | 1.01 | 0.59 | 0.002 | 0.07 | 0.060 | 0.0049 |
| D | 0.26 | 0.10 | 0.06 | 0.0244 | 0.0002 | 0.094 | 0.39 | 0.86 | 0.005 | 0.13 | 0.097 | 0.0038 |
| E | 0.28 | 0.40 | 0.24 | 0.0289 | 0.0081 | 0.085 | 0.32 | 0.48 | 0.003 | 0.10 | 0.070 | 0.0025 |
| F | 0.28 | 0.14 | 0.09 | 0.0074 | 0.0071 | 0.099 | 0.48 | 1.49 | 0.003 | 0.21 | 0.051 | 0.0021 |
| G | 0.25 | 0.14 | 0.04 | 0.0091 | 0.0009 | 0.073 | 0.47 | 0.40 | 0.004 | 0.26 | 0.040 | 0.0011 |
| H | 0.50 | 0.16 | 0.27 | 0.0149 | 0.0029 | 0.075 | 1.11 | 0.82 | 0.004 | 0.17 | 0.074 | 0.0045 |
| I | 0.32 | 0.26 | 0.27 | 0.0167 | 0.0062 | 0.030 | 0.66 | 0.65 | 0.003 | 0.06 | 0.036 | 0.0041 |
| J | 0.38 | 0.29 | 0.23 | 0.0010 | 0.0073 | 0.054 | 1.18 | 0.30 | 0.005 | 0.07 | 0.089 | 0.0002 |
| K | 0.38 | 0.19 | 0.85 | 0.0234 | 0.0023 | 0.006 | 0.71 | 0.58 | 0.002 | 0.12 | 0.023 | 0.0036 |
| L | 0.22 | 0.44 | 0.64 | 0.0236 | 0.0062 | 0.013 | 0.68 | 0.83 | 0.003 | 0.09 | 0.017 | 0.0034 |
| M | 0.26 | 0.20 | 0.95 | 0.0038 | 0.0070 | 0.080 | 0.48 | 1.22 | 0.003 | 0.05 | 0.089 | 0.0014 |
| N | 0.30 | 0.41 | 0.58 | 0.0004 | 0.0047 | 0.028 | 0.20 | 0.93 | 0.004 | 0.04 | 0.048 | 0.0015 |
| O | 0.35 | 0.38 | 0.60 | 0.0197 | 0.0070 | 0.010 | 1.40 | 0.48 | 0.004 | 0.08 | 0.093 | 0.0008 |
| P | 0.26 | 0.46 | 0.90 | 0.0008 | 0.0071 | 0.066 | 0.40 | 0.14 | 0.003 | 0.09 | 0.016 | 0.0046 |
| Q | 0.47 | 0.44 | 0.27 | 0.0027 | 0.0087 | 0.062 | 0.40 | 1.62 | 0.002 | 0.04 | 0.018 | 0.0042 |
| R | 0.24 | 0.41 | 0.98 | 0.0215 | 0.0074 | 0.021 | 0.40 | 0.43 | 0.003 | 0.08 | 0.066 | 0.0020 |
| S | 0.39 | 0.21 | 0.52 | 0.0075 | 0.0500 | 0.085 | 1.04 | 1.22 | 0.004 | 0.11 | 0.081 | 0.0007 |
| T | 0.37 | 0.40 | 0.54 | 0.0094 | 0.0002 | 0.250 | 0.40 | 0.89 | 0.004 | 0.12 | 0.017 | 0.0048 |

| Steel | Chemical Composition (in the unit of mass %, the balance being Fe and impurities) | | | | | | | | | |
|---|---|---|---|---|---|---|---|---|---|---|
| | N | O | Ca | Mg | Zr | REM | Co | W | Cu | Ni |
| A | 0.0032 | 0.0016 | — | — | — | — | — | — | — | — |
| B | 0.0005 | 0.0002 | 0.0058 | — | — | — | — | — | — | — |
| C | 0.0068 | 0.0046 | — | 0.0027 | — | — | — | — | — | — |
| D | 0.0011 | 0.0009 | — | — | 0.0041 | — | — | — | — | — |
| E | 0.0095 | 0.0044 | — | — | — | 0.0045 | — | — | — | — |
| F | 0.0098 | 0.0037 | — | — | — | — | 0.34 | — | — | — |
| G | 0.0044 | 0.0020 | — | — | — | — | — | 0.50 | — | — |
| H | 0.0038 | 0.0003 | — | — | — | — | — | — | 0.05 | — |
| I | 0.0006 | 0.0035 | — | — | — | — | — | — | — | 0.10 |
| J | 0.0095 | 0.0017 | 0.0002 | — | 0.0016 | — | — | — | — | — |
| K | 0.0044 | 0.0020 | 0.0009 | — | — | 0.0020 | — | — | — | — |
| L | 0.0066 | 0.0013 | — | — | — | — | — | 0.34 | — | 0.18 |

TABLE 1-continued

| | | |
|---|---|---|
| M | 0.0030 | 0.0014 |
| N | 0.0075 | 0.0021 |
| O | 0.0003 | 0.0004 |
| P | 0.0032 | 0.0032 |
| Q | 0.0059 | 0.0006 |
| R | 0.0076 | 0.0080 |
| S | 0.0062 | 0.0025 |
| T | 0.0008 | 0.0050 |

A billet having an outer diameter of 310 mm was produced by using the above molten steel. The produced billet was heated to 1250° C. and thereafter was subjected to hot rolling to produce a hollow shell having an outer diameter of 273.5 mm and a wall thickness of 17.07 mm. Steels used for hollow shells of each test number are shown in Tables 2 to 7.

TABLE 2

| | | | | | Off-line heat treatment | | | | | | | | | |
|---|---|---|---|---|---|---|---|---|---|---|---|---|---|---|
| | | | | | Quenching process | | | Tempering process | | | | | | |
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 1-1 | A | Performed | 1 | A | 900 | 30 | 730 | 55 | 2 | 69 | 726 | 803 | 90.4 | E | A |
| 1-2 | A | Performed | 2 | A | 900 | 30 | 730 | 55 | 3 | 105 | 744 | 829 | 89.7 | E | A |
| 1-3 | A | Performed | 3 | A | 900 | 30 | 730 | 55 | 4 | 134 | 738 | 816 | 90.4 | E | B |
| 1-4 | A | Performed | 4 | A | 900 | 30 | 730 | 55 | 5 | 179 | 705 | 786 | 89.7 | E | C |
| 1-5 | A | Not-performed | 2 | A | 900 | 30 | 730 | 55 | 2 | 95 | 658 | 725 | 90.7 | E | A |
| 1-6 | A | Performed | 1 | B | 900 | 30 | 730 | 55 | 2 | 85 | 744 | 818 | 90.9 | E | A |
| 1-7 | A | Performed | 2 | B | 900 | 30 | 730 | 55 | 3 | 104 | 656 | 735 | 89.3 | E | A |
| 1-8 | A | Performed | 3 | B | 900 | 30 | 730 | 55 | 4 | 145 | 756 | 862 | 87.7 | E | B |
| 1-9 | A | Performed | 4 | B | 900 | 30 | 730 | 55 | 5 | 174 | 686 | 789 | 87.0 | E | C |
| 1-10 | A | Performed | 1 | B | 900 | 30 | 730 | 110 | 2 | 108 | 750 | 847 | 88.5 | E | A |
| 1-11 | A | Not-performed | 2 | B | 900 | 30 | 730 | 55 | 2 | 100 | 732 | 820 | 89.3 | E | A |
| 1-12 | B | Performed | 1 | A | 900 | 30 | 730 | 55 | 2 | 73 | 674 | 755 | 89.3 | E | A |
| 1-13 | B | Performed | 2 | A | 900 | 30 | 730 | 55 | 3 | 112 | 665 | 737 | 90.2 | E | A |
| 1-14 | C | Performed | 1 | A | 900 | 30 | 730 | 55 | 2 | 79 | 691 | 760 | 90.9 | E | A |
| 1-15 | C | Performed | 2 | A | 900 | 30 | 730 | 55 | 3 | 103 | 679 | 755 | 89.9 | E | A |

TABLE 3

| | | | | | Off-line heat treatment | | | | | | | | | |
|---|---|---|---|---|---|---|---|---|---|---|---|---|---|---|
| | | | | | Quenching process | | | Tempering process | | | | | | |
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 1-16 | D | Performed | 1 | A | 900 | 30 | 730 | 55 | 2 | 70 | 726 | 804 | 90.3 | E | A |
| 1-17 | D | Performed | 2 | A | 900 | 30 | 730 | 55 | 3 | 105 | 660 | 747 | 88.4 | E | A |
| 1-18 | E | Performed | 1 | A | 900 | 30 | 730 | 55 | 2 | 71 | 658 | 739 | 89.0 | E | A |
| 1-19 | E | Performed | 2 | A | 900 | 30 | 730 | 55 | 3 | 94 | 663 | 753 | 88.1 | E | A |
| 1-20 | F | Performed | 1 | A | 900 | 30 | 730 | 55 | 2 | 70 | 693 | 783 | 88.5 | E | A |
| 1-21 | F | Performed | 2 | A | 900 | 30 | 730 | 55 | 3 | 99 | 715 | 814 | 87.8 | E | A |
| 1-22 | G | Performed | 1 | A | 900 | 30 | 730 | 55 | 2 | 73 | 706 | 808 | 87.4 | E | A |
| 1-23 | G | Performed | 2 | A | 900 | 30 | 730 | 55 | 3 | 109 | 699 | 792 | 88.3 | E | A |
| 1-24 | H | Performed | 1 | A | 900 | 30 | 730 | 55 | 2 | 71 | 684 | 769 | 88.9 | E | A |
| 1-25 | I | Performed | 1 | A | 900 | 30 | 730 | 55 | 2 | 82 | 734 | 835 | 87.9 | E | A |
| 1-26 | J | Performed | 1 | A | 900 | 30 | 730 | 55 | 2 | 59 | 672 | 758 | 88.6 | E | A |

TABLE 3-continued

| | | | Off-line heat treatment | | | | | | | | | | | |
|---|---|---|---|---|---|---|---|---|---|---|---|---|---|---|
| | | | Quenching process | | | | Tempering process | | | | | | | |
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 1-27 | K | Performed | 1 | A | 900 | 30 | 730 | 55 | 2 | 62 | 749 | 850 | 88.1 | E | A |
| 1-28 | L | Performed | 1 | A | 900 | 30 | 730 | 55 | 2 | 67 | 722 | 829 | 87.1 | E | A |
| 1-29 | M | Performed | 2 | C | 900 | 30 | 730 | 55 | 3 | 156 | 723 | 823 | 87.9 | E | C |
| 1-30 | M | Performed | 3 | C | 900 | 30 | 730 | 55 | 4 | 183 | 692 | 765 | 90.4 | E | C |

TALBE 4

| | | | Off-line heat treatment | | | | | | | | | | | |
|---|---|---|---|---|---|---|---|---|---|---|---|---|---|---|
| | | | Quenching process | | | | Tempering process | | | | | | | |
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 2-1 | A | Performed | 1 | A | 900 | 30 | 700 | 55 | 2 | 66 | 800 | 893 | 89.6 | E | A |
| 2-2 | A | Performed | 2 | A | 900 | 30 | 700 | 55 | 3 | 100 | 805 | 896 | 89.8 | E | A |
| 2-3 | A | Performed | 3 | A | 900 | 30 | 700 | 55 | 4 | 131 | 820 | 905 | 90.6 | E | B |
| 2-4 | A | Performed | 4 | A | 900 | 30 | 700 | 55 | 5 | 172 | 816 | 902 | 90.5 | E | C |
| 2-5 | A | Not-performed | 2 | A | 900 | 30 | 700 | 55 | 2 | 96 | 797 | 890 | 89.6 | E | A |
| 2-6 | A | Performed | 1 | B | 900 | 30 | 700 | 55 | 2 | 75 | 788 | 877 | 89.9 | E | A |
| 2-7 | A | Performed | 2 | B | 900 | 30 | 700 | 55 | 3 | 101 | 809 | 890 | 90.9 | E | A |
| 2-8 | A | Performed | 3 | B | 900 | 30 | 700 | 55 | 4 | 147 | 816 | 894 | 91.3 | E | B |
| 2-9 | A | Performed | 4 | B | 900 | 30 | 700 | 55 | 5 | 175 | 815 | 892 | 91.4 | E | C |
| 2-10 | A | Performed | 1 | B | 900 | 30 | 690 | 110 | 2 | 110 | 779 | 863 | 90.3 | E | A |
| 2-11 | A | Not-performed | 2 | B | 900 | 30 | 700 | 55 | 2 | 99 | 780 | 870 | 89.7 | E | A |
| 2-12 | B | Performed | 1 | A | 900 | 30 | 700 | 55 | 2 | 71 | 795 | 872 | 91.2 | E | A |
| 2-13 | B | Performed | 2 | A | 900 | 30 | 700 | 55 | 3 | 108 | 814 | 883 | 92.2 | E | A |
| 2-14 | C | Performed | 1 | A | 900 | 30 | 700 | 55 | 2 | 77 | 783 | 871 | 89.9 | E | A |
| 2-15 | C | Performed | 2 | A | 900 | 30 | 700 | 55 | 3 | 101 | 799 | 882 | 90.6 | E | A |
| 2-16 | D | Performed | 1 | A | 900 | 30 | 700 | 55 | 2 | 64 | 794 | 882 | 90.0 | E | A |
| 2-17 | D | Performed | 2 | A | 900 | 30 | 700 | 55 | 3 | 105 | 812 | 896 | 90.6 | E | A |
| 2-18 | E | Performed | 1 | A | 900 | 30 | 700 | 55 | 2 | 79 | 778 | 863 | 90.2 | E | A |
| 2-19 | E | Performed | 2 | A | 900 | 30 | 700 | 55 | 3 | 98 | 797 | 874 | 91.2 | E | A |

TABLE 5

| | | | Off-line heat treatment | | | | | | | | | | | |
|---|---|---|---|---|---|---|---|---|---|---|---|---|---|---|
| | | | Quenching process | | | | Tempering process | | | | | | | |
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 2-20 | F | Performed | 1 | A | 900 | 30 | 700 | 55 | 2 | 77 | 788 | 873 | 90.3 | E | A |
| 2-21 | F | Performed | 2 | A | 900 | 30 | 700 | 55 | 3 | 100 | 793 | 877 | 90.4 | E | A |
| 2-22 | G | Performed | 1 | A | 900 | 30 | 700 | 55 | 2 | 72 | 790 | 873 | 90.5 | E | A |
| 2-23 | G | Performed | 2 | A | 900 | 30 | 700 | 55 | 3 | 108 | 808 | 880 | 91.8 | E | A |
| 2-24 | H | Performed | 1 | A | 900 | 30 | 700 | 55 | 2 | 78 | 782 | 863 | 90.6 | E | A |
| 2-25 | I | Performed | 1 | A | 900 | 30 | 700 | 55 | 2 | 74 | 788 | 873 | 90.3 | E | A |
| 2-26 | J | Performed | 1 | A | 900 | 30 | 700 | 55 | 2 | 61 | 791 | 876 | 90.3 | E | A |
| 2-27 | K | Performed | 1 | A | 900 | 30 | 700 | 55 | 2 | 63 | 810 | 885 | 91.5 | E | A |
| 2-28 | L | Performed | 1 | A | 900 | 30 | 700 | 55 | 2 | 64 | 795 | 872 | 91.2 | E | A |
| 2-29 | M | Performed | 2 | C | 900 | 30 | 700 | 55 | 3 | 156 | 816 | 905 | 90.2 | E | C |
| 2-30 | M | Performed | 3 | C | 900 | 30 | 700 | 55 | 4 | 181 | 821 | 904 | 90.8 | E | C |
| 2-31 | N | Performed | 1 | A | 900 | 30 | 700 | 55 | 2 | 76 | 798 | 885 | 90.2 | NA | A |

TABLE 5-continued

| | | | | Off-line heat treatment | | | | | | | | | | |
|---|---|---|---|---|---|---|---|---|---|---|---|---|---|---|
| | | | | Quenching process | | | Tempering process | | | | | | | |
| Test No. | Steel | Direct quenching | Number of times | Used gas | Quenching temperature (°C.) | Quenching time (min) | Tempering temperature (°C.) | Tempering time (min) | Total number of times of quenching | Decarburized layer depth (μm) | YS (MPa) | TS (MPa) | YR (%) | SSC resistance | Accuracy of ultrasonic inspection |
| 2-32 | O | Performed | 1 | A | 900 | 30 | 700 | 55 | 2 | 67 | 787 | 868 | 90.7 | NA | A |
| 2-33 | P | Performed | 1 | A | 900 | 30 | 700 | 55 | 2 | 64 | 797 | 877 | 90.9 | NA | A |
| 2-34 | Q | Performed | 1 | A | 900 | 30 | 700 | 55 | 2 | 73 | 788 | 873 | 90.3 | NA | A |
| 2-35 | R | Performed | 1 | A | 900 | 30 | 700 | 55 | 2 | 66 | 804 | 893 | 90.0 | NA | A |
| 2-36 | S | Performed | 1 | A | 900 | 30 | 700 | 55 | 2 | 74 | 785 | 871 | 90.1 | NA | A |
| 2-37 | T | Performed | 1 | A | 900 | 30 | 700 | 55 | 2 | 69 | 794 | 873 | 91.0 | NA | A |

TABLE 6

| | | | | Off-line heat treatment | | | | | | | | | | |
|---|---|---|---|---|---|---|---|---|---|---|---|---|---|---|
| | | | | Quenching process | | | Tempering process | | | | | | | |
| Test No. | Steel | Direct quenching | Number of times | Used gas | Quenching temperature (°C.) | Quenching time (min) | Tempering temperature (°C.) | Tempering time (min) | Total number of times of quenching | Decarburized layer depth (μm) | YS (MPa) | TS (MPa) | YR (%) | SSC resistance | Accuracy of ultrasonic inspection |
| 3-1 | A | Performed | 1 | A | 900 | 30 | 670 | 55 | 2 | 63 | 922 | 1024 | 90.0 | E | A |
| 3-2 | A | Performed | 2 | A | 900 | 30 | 670 | 55 | 3 | 96 | 892 | 980 | 91.0 | E | A |
| 3-3 | A | Performed | 3 | A | 900 | 30 | 670 | 55 | 4 | 132 | 895 | 1002 | 89.3 | E | B |
| 3-4 | A | Performed | 4 | A | 900 | 30 | 670 | 55 | 5 | 171 | 898 | 991 | 90.6 | E | C |
| 3-5 | A | Not-performed | 2 | A | 900 | 30 | 670 | 55 | 2 | 92 | 884 | 982 | 90.0 | E | A |
| 3-6 | A | Performed | 1 | B | 900 | 30 | 670 | 55 | 2 | 74 | 876 | 973 | 90.0 | E | A |
| 3-7 | A | Performed | 2 | B | 900 | 30 | 670 | 55 | 3 | 99 | 879 | 981 | 89.6 | E | A |
| 3-8 | A | Performed | 3 | B | 900 | 30 | 670 | 55 | 4 | 144 | 920 | 1020 | 90.2 | E | B |
| 3-9 | A | Performed | 4 | B | 900 | 30 | 670 | 55 | 5 | 168 | 905 | 1004 | 90.1 | E | C |
| 3-10 | A | Performed | 1 | B | 900 | 30 | 670 | 110 | 2 | 107 | 888 | 982 | 90.4 | E | A |
| 3-11 | A | Not-performed | 2 | B | 900 | 30 | 670 | 55 | 2 | 92 | 885 | 974 | 90.9 | E | A |
| 3-12 | B | Performed | 1 | A | 900 | 30 | 670 | 55 | 2 | 63 | 909 | 1016 | 89.5 | E | A |
| 3-13 | B | Performed | 2 | A | 900 | 30 | 670 | 55 | 3 | 101 | 880 | 968 | 90.9 | E | A |
| 3-14 | C | Performed | 1 | A | 900 | 30 | 670 | 55 | 2 | 74 | 864 | 965 | 89.5 | E | A |
| 3-15 | C | Performed | 2 | A | 900 | 30 | 670 | 55 | 3 | 98 | 928 | 1024 | 90.6 | E | A |
| 3-16 | D | Performed | 1 | A | 900 | 30 | 670 | 55 | 2 | 59 | 892 | 985 | 90.6 | E | A |
| 3-17 | D | Performed | 2 | A | 900 | 30 | 670 | 55 | 3 | 102 | 899 | 989 | 90.9 | E | A |
| 3-18 | E | Performed | 1 | A | 900 | 30 | 670 | 55 | 2 | 69 | 870 | 978 | 89.0 | E | A |
| 3-19 | E | Performed | 2 | A | 900 | 30 | 670 | 55 | 3 | 93 | 926 | 1021 | 90.7 | E | A |

TABLE 7

| | | | | Off-line heat treatment | | | | | | | | | | |
|---|---|---|---|---|---|---|---|---|---|---|---|---|---|---|
| | | | | Quenching process | | | Tempering process | | | | | | | |
| Test No. | Steel | Direct quenching | Number of times | Used gas | Quenching temperature (°C.) | Quenching time (min) | Tempering temperature (°C.) | Tempering time (min) | Total number of times of quenching | Decarburized layer depth (μm) | YS (MPa) | TS (MPa) | YR (%) | SSC resistance | Accuracy of ultrasonic inspection |
| 3-20 | F | Performed | 1 | A | 900 | 30 | 670 | 55 | 2 | 67 | 893 | 1002 | 89.1 | E | A |
| 3-21 | F | Performed | 2 | A | 900 | 30 | 670 | 55 | 3 | 92 | 876 | 981 | 89.3 | E | A |
| 3-22 | G | Performed | 1 | A | 900 | 30 | 670 | 55 | 2 | 66 | 892 | 991 | 90.0 | E | A |
| 3-23 | G | Performed | 2 | A | 900 | 30 | 670 | 55 | 3 | 103 | 922 | 1031 | 89.4 | E | A |
| 3-24 | H | Performed | 1 | A | 900 | 30 | 670 | 55 | 2 | 70 | 922 | 1018 | 90.6 | E | A |
| 3-25 | I | Performed | 1 | A | 900 | 30 | 670 | 55 | 2 | 71 | 886 | 990 | 89.5 | E | A |
| 3-26 | J | Performed | 1 | A | 900 | 30 | 670 | 55 | 2 | 56 | 925 | 1027 | 90.1 | E | A |
| 3-27 | K | Performed | 1 | A | 900 | 30 | 670 | 55 | 2 | 55 | 915 | 1014 | 90.2 | E | A |
| 3-28 | L | Performed | 1 | A | 900 | 30 | 670 | 55 | 2 | 62 | 890 | 978 | 91.0 | E | A |
| 3-29 | M | Performed | 2 | C | 900 | 30 | 670 | 55 | 3 | 151 | 904 | 1011 | 89.4 | E | C |

TABLE 7-continued

| | | | | | Quenching process | | Tempering process | | | | | | | | |
|---|---|---|---|---|---|---|---|---|---|---|---|---|---|---|---|
| Test No. | Steel | Direct quenching | Number of times | Used gas | Quenching temperature (° C.) | Quenching time (min) | Tempering temperature (° C.) | Tempering time (min) | Total number of times of quenching | Decarburized layer depth (μm) | YS (MPa) | TS (MPa) | YR (%) | SSC resistance | Accuracy of ultrasonic inspection |
| 3-30 | M | Performed | 3 | C | 900 | 30 | 670 | 55 | 4 | 180 | 910 | 1010 | 90.1 | E | C |
| 3-31 | N | Performed | 1 | A | 900 | 30 | 670 | 55 | 2 | 74 | 904 | 1006 | 89.9 | NA | A |
| 3-32 | O | Performed | 1 | A | 900 | 30 | 670 | 55 | 2 | 59 | 883 | 985 | 89.6 | NA | A |
| 3-33 | P | Performed | 1 | A | 900 | 30 | 670 | 55 | 2 | 57 | 887 | 977 | 90.8 | NA | A |
| 3-34 | Q | Performed | 1 | A | 900 | 30 | 670 | 55 | 2 | 63 | 924 | 1018 | 90.8 | NA | A |
| 3-35 | R | Performed | 1 | A | 900 | 30 | 670 | 55 | 2 | 59 | 922 | 1034 | 89.2 | NA | A |
| 3-36 | S | Performed | 1 | A | 900 | 30 | 670 | 55 | 2 | 66 | 921 | 1028 | 89.6 | NA | A |
| 3-37 | T | Performed | 1 | A | 900 | 30 | 670 | 55 | 2 | 62 | 881 | 968 | 91.0 | NA | A |

It is shown in the "Direct quenching" column in Tables 2 to 7 whether or not the direct quenching was performed for a hollow shell of each test number after hot rolling. Specifically, in test numbers other than Test Numbers 1-5, 1-11, 2-5, 2-11, 3-5 and 3-11, direct quenching was performed in which a hollow shell after hot rolling was subjected to supplementary heating for 10 minutes in a supplementary heating furnace at 920° C. and was water cooled. Note that in the present examples, as the atmospheric gas in the supplementary heating furnace, the same atmospheric gas as that in the quenching furnace to be described below (see the "Used gas" column in Tables 2 to 7) was used. Thereafter, tempering was performed in each hollow shell at tempering temperature of 550° C. for tempering time of 45 minutes. On the other hand, in Test Numbers 1-5, 1-11, 2-5, 2-11, 3-5 and 3-11, the hollow shells after hot rolling were allowed to cool to the room temperature instead of the performing direct quenching.

Successively, the hollow shell of each test number was repeatedly subjected to off-line heat treatment (off-line quenching and off-line tempering) for the number of times as shown in Tables 2 to 7. The total number of times of quenching (total number of the direct quenching and the off-line quenching) performed for the hollow shell of each test number was as shown in Tables 2 to 7. The atmospheric gas in the quenching furnace in the off-line quenching is shown in the "Used gas" column in Tables 2 to 7. Here, Gas "A" means a gas obtained by combusting a mixed gas containing a total of 11 to 15% in volume fraction of flammable gas (methane, ethylene, hydrogen gas, and carbon monoxide), with the balance being air. The oxygen concentration of gas A was 2 to 7% in volume fraction excepting water vapor.

Gas "B" means a gas obtained by combusting a mixed gas containing a total of 5 to 8% in volume fraction of flammable gas (methane, ethylene, propane, and butane) with the balance being air. The oxygen concentration of Gas B was 2 to 7% in volume fraction excepting water vapor. Gas "C" means a gas obtained by combusting a mixed gas containing a total of 5 to 8% in volume fraction of flammable gas (methane, ethylene, hydrogen gas, and carbon monoxide) with the balance being air. The oxygen concentration of Gas C was 12 to 15% in volume fraction excepting water vapor.

In the quenching treatment performed on the hollow shell of each test number, the quenching temperature (° C.) and the quenching time (staying time in the quenching furnace) (min) are shown in Tables 2 to 7. Moreover, for the hollow shell of each test number, the cooling rate during quenching $CR_{800-500}$ was determined from the surface temperature of the hollow shell of each test number and a time period from the entrance side to the delivery side of the quenching equipment. All of the thus determined cooling rates during quenching $CR_{800-500}$ of each test number were 30° C./sec or more. Further, in the tempering treatment performed on the hollow shell of each test number, the tempering temperature (° C.) and the tempering time (staying time in the tempering furnace) (min) at the tempering temperature are shown in Tables 2 to 7. In the present example, the quenching temperature (° C.) was brought to the temperature of the furnace in which reheating in the quenching treatment was performed. In same manner, the tempering temperature (° C.) was brought to the temperature of the furnace in which reheating in the tempering treatment was performed.

Note that the tempering temperature and the tempering time were adjusted such that the yield strength of the hollow shell of each test number was 655 MPa or more (95 ksi or more). Specifically, the tempering temperature and the tempering time were adjusted such that the yield strength of the hollow shell of Test Numbers 1-1 to 1-30 was 655 to less than 758 MPa (95 ksi grade). The tempering temperature and the tempering time were adjusted such that the yield strength of the hollow shell of Test Numbers 2-1 to 2-37 was 758 to less than 862 MPa (110 ksi grade). The tempering temperature and the tempering time were adjusted such that the yield strength of the hollow shell of Test Numbers 3-1 to 3-37 was 862 to 965 MPa (125 ksi grade). The seamless steel pipe of each test number was produced by the production process described above.

[Evaluation Test]

The seamless steel pipe of each test number after the aforementioned tempering was subjected to a decarburized layer depth measurement test, a tensile test, an SSC resistance evaluation test, and an ultrasonic inspection test.

[Decarburized Layer Depth Measurement]

The depth of a decarburized layer was measured by the method described above using the seamless steel pipe of each test number. Specifically, a test specimen, which includes an inner surface of the seamless steel pipe of each test number and has an observation surface with dimensions of 10 mm in the pipe axis direction and 10 mm in the pipe radial direction, was taken. After being polished to be a mirror surface, the observation surface was immersed in a 2% nital etching reagent for about 10 seconds to perform etching. The etched observation surface was observed in 10 visual fields in a bright-field image by using an optical microscope. The area of each visual field was 0.1 mm² (magnification of 200 times).

In each visual field of each test number, ferrite was identified based on contrast and was defined as a decarburized layer. A deepest position of decarburized layer in each visual field wad identified, and a depth from the surface of the seamless steel pipe was determined. An arithmetic average value of the depths of decarburized layers in 10 visual fields was defined as a decarburized layer depth (μm). The decarburized layer depth (μm) of the seamless steel pipe of each test number is shown in Tables 2 to 7.

[Tensile Test]

A tensile test was performed by the method described above by using the seamless steel pipe of each test number to measure yield strength, tensile strength, and yield ratio. Specifically, a tensile test was performed in conformity with ASTM E8/E8M (2013). A round bar tensile test specimen having a parallel portion diameter of 4 mm and a parallel portion length of 35 mm was made from a center portion of the wall thickness of the seamless steel pipe of each test number. The axial direction of the round bar tensile test specimen was parallel with the pipe axis direction of the seamless steel pipe. Tensile tests were conducted at a normal temperature (25° C.) in the atmosphere by using the round bar test specimen of each test number to obtain yield strength (MPa) of the seamless steel pipe of each test number.

Note that, in the present example, the obtained stress at the time of 0.5% total elongation (0.5% proof stress) by the tensile test is less than 758 MPa, the 0.5% proof stress is used as the yield strength. Further, in the present example, the obtained stress at the time of 0.7% total elongation (0.7% proof stress) by the tensile test is 758 MPa or more, the 0.7% proof stress is used as the yield strength. Furthermore, the obtained maximum stress during uniform elongation in the tensile test is used as the tensile strength. A ratio of the obtained tensile strength to the obtained yield strength is used as the yield ratio. Obtained yield strength (MPa), tensile strength (MPa), and yield ratio (%) are shown in Tables 2 to 7 as YS (MPa), TS (MPa), and YR (%).

[SSC Resistance Evaluation Test]

SSC resistance was evaluated by a method in conformity with Method A specified in NACE TM0177-2005 by using seamless steel pipes of each test number. Specifically, each of the SSC resistance evaluation test for the seamless steel pipe of which Test Numbers 1-1 to 1-30 having the yield strength of 655 to less than 758 MPa (95 ksi grade), Test Numbers 2-1 to 2-37 having the yield strength of 758 to less than 862 MPa (110 ksi grade) and Test Numbers 3-1 to 3-37 having the yield strength of 862 to 965 MPa (125 ksi grade) will be described.

[SSC Resistance for Seamless Steel Pipe of Test Numbers 1-1 to 1-30]

A round bar test specimen having a diameter of 6.35 mm and a length of the parallel portion of 25.4 mm was taken from a center portion of wall thickness of the seamless steel pipe of Test Numbers 1-1 to 1-30. The axial direction of the round bar test specimen was parallel with the pipe axis direction of the seamless steel pipe. Tensile stress is applied in the axial direction of the test specimen of Test Numbers 1-1 to 1-30. At this time, stress to be applied to each test specimen was adjusted to be 90% of an actual yield stress of the seamless steel pipe of each Test Numbers 1-1 to 1-30 in conformity with Method A specified in NACE TM0177-2005.

A mixed aqueous solution containing 5.0 mass % of sodium chloride and 0.5 mass % of acetic acid (NACE solution A) was used as the test solution. The test solution of 24° C. was poured respectively into three test vessels to provide test baths. Each of the three round bar test specimens under applied stress was immersed in a different test bath. After the test bath was degassed, 1 atm of $H_2S$ gas was blown into the test bath to saturate the test bath therewith. The test bath was held at 24° C. for 720 hours.

The round bar test specimen of Test Numbers 1-1 to 1-30 after being held for 720 hours was observed whether or not a sulfide stress crack (SSC) had occurred. Specifically, the test specimen after being immersed for 720 hours was observed with the naked eye. As a result of the observation, a test number for which no crack was confirmed in all of the three test specimens was determined to be "E" (Excellent). On the other hand, a test number for which crack was confirmed in at least one test specimen was determined to be "NA" (Not Acceptable). The results of the SSC resistance evaluation test of Test Numbers 1-1 to 1-30 are shown in Tables 2 and 3.

[SSC Resistance for Seamless Steel Pipe of Test Numbers 2-1 to 2-37]

A round bar test specimen having a diameter of 6.35 mm and a length of the parallel portion of 25.4 mm was taken from a center portion of wall thickness of the seamless steel pipe of Test Numbers 2-1 to 2-37. The axial direction of the round bar test specimen was parallel with the pipe axis direction of the seamless steel pipe. Tensile stress is applied in the axial direction of the test specimen of Test Numbers 2-1 to 2-37. At this time, stress to be applied to each test specimen was adjusted to be 90% of an actual yield stress of the seamless steel pipe of each Test Numbers 2-1 to 2-37 in conformity with Method A specified in NACE TM0177-2005.

A mixed aqueous solution containing 5.0 mass % of sodium chloride and 0.5 mass % of acetic acid (NACE solution A) was used as the test solution. The test solution of 24° C. was poured respectively into three test vessels to provide test baths. Each of the three round bar test specimens under applied stress was immersed in a different test bath. After the test bath was degassed, 1 atm of $H_2S$ gas was blown into the test bath to saturate the test bath therewith. The test bath was held at 24° C. for 720 hours.

The round bar test specimen of Test Numbers 2-1 to 2-37 after being held for 720 hours was observed whether or not a sulfide stress crack (SSC) had occurred. Specifically, the test specimen after being immersed for 720 hours was observed with the naked eye. As a result of the observation, a test number for which no crack was confirmed in all of the three test specimens was determined to be "E" (Excellent). On the other hand, a test number for which crack was confirmed in at least one test specimen was determined to be "NA" (Not Acceptable). The results of the SSC resistance evaluation test of Test Numbers 2-1 to 2-37 are shown in Tables 4 and 5.

[SSC Resistance for Seamless Steel Pipe of Test Numbers 3-1 to 3-37]

A round bar test specimen having a diameter of 6.35 mm and a length of the parallel portion of 25.4 mm was taken from a center portion of wall thickness of the seamless steel pipe of Test Numbers 3-1 to 3-37. The axial direction of the round bar test specimen was parallel with the pipe axis direction of the seamless steel pipe. Tensile stress is applied in the axial direction of the test specimen of Test Numbers 3-1 to 3-37. At this time, stress to be applied to each test specimen was adjusted to be 90% of an actual yield stress of the seamless steel pipe of each Test Numbers 3-1 to 3-37 in conformity with Method A specified in NACE TM0177-2005.

A mixed aqueous solution containing 5.0 mass % of sodium chloride, 0.41 mass % of sodium acetate and 2.5 mass % of acetic acid (NACE solution B) was used as the test solution. The test solution of 24° C. was poured respectively into three test vessels to provide test baths. Each of the three round bar test specimens under applied stress was immersed in a different test bath. After the test bath was degassed, a mixed gas of 0.1 atm of $H_2S$ gas and 0.9 atm of $CO_2$ gas was blown into the test bath to saturate the test bath therewith. The test bath was held at 24° C. for 720 hours.

The round bar test specimen of Test Numbers 3-1 to 3-37 after being held for 720 hours was observed whether or not a sulfide stress crack (SSC) had occurred. Specifically, the test specimen after being immersed for 720 hours was observed with the naked eye. As a result of the observation, a test number for which no crack was confirmed in all of the three test specimens was determined to be "E" (Excellent). On the other hand, a test number for which crack was confirmed in at least one test specimen was determined to be "NA" (Not Acceptable). The results of the SSC resistance evaluation test of Test Numbers 3-1 to 3-37 are shown in Tables 6 and 7.

[Ultrasonic Inspection Test]

Using the seamless steel pipe of each test number, an ultrasonic inspection test was conducted in the following way. Specifically, using a local-immersion type ultrasonic inspection apparatus, an ultrasonic inspection test was conducted by L-direction oblique flaw detection to determine SN ratios. The sensitivity setting of the ultrasonic inspection apparatus was performed by using an artificial defect, which was provided at a depth position of 3% of wall thickness in the pipe axis direction from the inner surface of the seamless steel pipe of each test number. The artificial defect was a notch formed by electrical discharge machining and had dimensions of a depth of 0.275 mm, a width of 1 mm, and a length of 50.8 mm. The longitudinal direction of the artificial defect was made parallel with the pipe circumferential direction.

Using the ultrasonic inspection apparatus which was subjected to sensitivity setting, SN ratio measurement at each test number was performed in the following way. By making ultrasonic waves incident 10 times, a defect height and a maximum noise height were determined. The incident angle of ultrasonic waves that were made incident to a seamless steel pipe from the outer surface of the seamless steel pipe during flaw detection was set to be 45°. An average of 10 defect heights was defined as an S value. An average of 10 maximum noise heights was defined as an N value. By using the obtained S value and N value, an SN ratio (=S/N) was determined.

When the determined SN ratio was more than 4, it was determined that further excellent accuracy of ultrasonic inspection was exhibited (indicated by "A" in Tables 2 to 7). When the determined SN ratio was 3 to 4, it was determined that excellent accuracy of ultrasonic inspection was exhibited (indicated by "B" in Tables 2 to 7). On the other hand, when the SN ratio is less than 3, it was determined that excellent accuracy of ultrasonic inspection was not exhibited (indicated by "C" in Tables 2 to 7). The results of ultrasonic inspection test of each test number are shown in Tables 2 to 7.

[Test Results]

Referring to Table 1, Table 2 and Table 3, in the seamless steel pipes of Test Numbers 1-1 to 1-3, 1-5 to 1-8, and 1-10 to 1-28, the chemical composition of base material was appropriate, the yield strength of base material was 655 to less than 758 MPa (95 ksi grade), the yield ratio of base material was 85.0% or more, and the decarburized layer depth was 150 μm or less. As a result, they exhibited excellent SSC resistance in the SSC resistance test. Further, as a result, they exhibited excellent accuracy of ultrasonic inspection in the ultrasonic inspection test.

In the seamless steel pipes of Test Numbers 1-1, 1-2, 1-5 to 1-7, and 1-10 to 1-28, the depth of decarburized layer was 130 μm or less. As a result, they exhibited further excellent accuracy of ultrasonic inspection in the ultrasonic inspection test.

On the other hand, in the seamless steep pipes of Test Numbers 1-4 and 1-9, the number of times of quenching was too large. For that reason, the decarburized layer depth was more than 150 μm. As a result, excellent accuracy of ultrasonic inspection was not exhibited.

In the seamless steel pipes of Test Numbers 1-29 and 30, the atmospheric gas in the quenching furnace was inappropriate. For that reason, the decarburized layer depth was more than 150 μm. As a result, excellent accuracy of ultrasonic inspection was not exhibited.

Further, referring to Table 1, Table 4 and Table 5, in the seamless steel pipes of Test Numbers 2-1 to 2-3, 2-5 to 2-8, and 2-10 to 2-28, the chemical composition of base material was appropriate, the yield strength of base material was 758 to less than 862 MPa (110 ksi grade), the yield ratio of base material was 85.0% or more, and the decarburized layer depth was 150 μm or less. As a result, they exhibited excellent SSC resistance in the SSC resistance test. Further, as a result, they exhibited excellent accuracy of ultrasonic inspection in the ultrasonic inspection test.

In the seamless steel pipes of Test Numbers 2-1, 2-2, 2-5 to 2-7, and 2-10 to 2-28, the depth of decarburized layer was 130 μm or less. As a result, they exhibited further excellent accuracy of ultrasonic inspection in the ultrasonic inspection test.

On the other hand, in the seamless steep pipes of Test Numbers 2-4 and 2-9, the number of times of quenching was too large. For that reason, the decarburized layer depth was more than 150 μm. As a result, excellent accuracy of ultrasonic inspection was not exhibited.

In the seamless steel pipes of Test Numbers 2-29 and 2-30, the atmospheric gas in the quenching furnace was inappropriate. For that reason, the decarburized layer depth was more than 150 μm. As a result, excellent accuracy of ultrasonic inspection was not exhibited.

In the seamless steel pipe of Test Number 2-31, the Cr content was too low. As a result, excellent SSC resistance was not exhibited.

In the seamless steel pipe of Test Number 2-32, the Cr content was too high. As a result, excellent SSC resistance was not exhibited.

In the seamless steel pipe of Test Number 2-33, the Mo content was too low. As a result, excellent SSC resistance was not exhibited.

In the seamless steel pipe of Test Number 2-34, the Mo content was too high. As a result, excellent SSC resistance was not exhibited.

In the seamless steel pipe of Test Number 2-35, the O content was too high. As a result, excellent SSC resistance was not exhibited.

In the seamless steel pipe of Test Number 2-36, the S content was too high. As a result, excellent SSC resistance was not exhibited.

In the seamless steel pipe of Test Number 2-37, the Al content was too high. As a result, excellent SSC resistance was not exhibited.

Further, referring to Table 1, Table 6 and Table 7, in the seamless steel pipes of Test Numbers 3-1 to 3-3, 3-5 to 3-8, and 3-10 to 3-28, the chemical composition of base material was appropriate, the yield strength of base material was 862 to 965 MPa (125 ksi grade), the yield ratio of base material was 85.0% or more, and the decarburized layer depth was 150 μm or less. As a result, they exhibited excellent SSC resistance in the SSC resistance test. Further, as a result, they exhibited excellent accuracy of ultrasonic inspection in the ultrasonic inspection test.

In the seamless steel pipes of Test Numbers 3-1, 3-2, 3-5 to 3-7, and 3-10 to 3-28, the depth of decarburized layer was 130 μm or less. As a result, they exhibited further excellent accuracy of ultrasonic inspection in the ultrasonic inspection test.

On the other hand, in the seamless steep pipes of Test Numbers 3-4 and 3-9, the number of times of quenching was too large. For that reason, the decarburized layer depth was more than 150 μm. As a result, excellent accuracy of ultrasonic inspection was not exhibited.

In the seamless steel pipes of Test Numbers 3-29 and 3-30, the atmospheric gas in the quenching furnace was inappropriate. For that reason, the decarburized layer depth was more than 150 μm. As a result, excellent accuracy of ultrasonic inspection was not exhibited.

In the seamless steel pipe of Test Number 3-31, the Cr content was too low. As a result, excellent SSC resistance was not exhibited.

In the seamless steel pipe of Test Number 3-32, the Cr content was too high. As a result, excellent SSC resistance was not exhibited.

In the seamless steel pipe of Test Number 3-33, the Mo content was too low. As a result, excellent SSC resistance was not exhibited.

In the seamless steel pipe of Test Number 3-34, the Mo content was too high. As a result, excellent SSC resistance was not exhibited.

In the seamless steel pipe of Test Number 3-35, the O content was too high. As a result, excellent SSC resistance was not exhibited.

In the seamless steel pipe of Test Number 3-36, the S content was too high. As a result, excellent SSC resistance was not exhibited.

In the seamless steel pipe of Test Number 3-37, the Al content was too high. As a result, excellent SSC resistance was not exhibited.

An embodiment of the present disclosure has been described above. However, the embodiment described above is merely an example for implementing the present disclosure. Accordingly, the present disclosure is not limited to the above embodiment, and the above embodiment can be appropriately modified and performed within a range that does not deviate from the gist of the present disclosure.

INDUSTRIAL APPLICABILITY

The seamless steel pipe according to the present disclosure is widely applicable to steel materials to be utilized in a severe environment such as a polar region, and preferably can be utilized as a seamless steel pipe that is utilized in an oil well environment, and further preferably can be utilized as a seamless steel pipe for casing pipes, tubing pipes or line pipes or the like.

The invention claimed is:

1. A seamless steel pipe, comprising a base material and a decarburized layer formed on a surface of the base material, wherein
a chemical composition of the base material consists of, in mass %,
C: 0.20 to 0.50%,
Si: 0.05 to 0.50%,
Mn: 0.01 to 1.00%,
P: 0.0300% or less,
S: 0.0100% or less,
Al: 0.005 to 0.100%,
Cr: 0.30 to 1.20%,
Mo: 0.30 to 1.50%,
Ti: 0.002 to 0.050%,
V: 0.01 to 0.30%,
Nb: 0.002 to 0.100%,
B: 0.0001 to 0.0050%,
N: 0.0100% or less,
O: 0.0050% or less,
Ca: 0 to 0.0100%,
Mg: 0 to 0.0100%,
Zr: 0 to 0.0100%,
rare earth metal: 0 to 0.0100%,
Co: 0 to 0.50%,
W: 0 to 0.50%,
Cu: 0 to 0.50%,
Ni: 0 to 0.50%, and
with the balance being Fe and impurities, wherein
a yield strength of the base material is 655 MPa or more,
a yield ratio of the base material is 85.0% or more, wherein
the decarburized layer has a depth of 15 to 150 μm.

2. The seamless steel pipe according to claim 1, wherein the chemical composition of the base material contains one or more elements selected from the group consisting of, in mass %:
Ca: 0.0001 to 0.0100%,
Mg: 0.0001 to 0.0100%,
Zr: 0.0001 to 0.0100%, and
rare earth metal: 0.0001 to 0.0100%.

3. The seamless steel pipe according to claim 2, wherein the chemical composition of the base material contains one or more elements selected from the group consisting of, in mass %:
Co: 0.02 to 0.50%, and
W: 0.02 to 0.50%.

4. The seamless steel pipe according to claim 3, wherein the decarburized layer has a depth of 15 to 130 μm.

5. The seamless steel pipe according to claim 3, wherein the chemical composition of the base material contains one or more elements selected from the group consisting of, in mass %:
Cu: 0.02 to 0.50%, and
Ni: 0.02 to 0.50%.

6. The seamless steel pipe according to claim 5, wherein the decarburized layer has a depth of 15 to 130 μm.

7. The seamless steel pipe according to claim 2, wherein the decarburized layer has a depth of 15 to 130 μm.

8. The seamless steel pipe according to claim 2, wherein the chemical composition of the base material contains one or more elements selected from the group consisting of, in mass %:
Cu: 0.02 to 0.50%, and
Ni: 0.02 to 0.50%.

9. The seamless steel pipe according to claim 8, wherein the decarburized layer has a depth of 15 to 130 μm.

10. The seamless steel pipe according to claim 1, wherein the chemical composition of the base material contains one or more elements selected from the group consisting of, in mass %:

Co: 0.02 to 0.50%, and
W: 0.02 to 0.50%.

11. The seamless steel pipe according to claim 10, wherein
the decarburized layer has a depth of 15 to 130 μm.

12. The seamless steel pipe according to claim 10, wherein
the chemical composition of the base material contains one or more elements selected from the group consisting of, in mass %:
Cu: 0.02 to 0.50%, and
Ni: 0.02 to 0.50%.

13. The seamless steel pipe according to claim 12, wherein
the decarburized layer has a depth of 15 to 130 μm.

14. The seamless steel pipe according to claim 1, wherein
the chemical composition of the base material contains one or more elements selected from the group consisting of, in mass %:
Cu: 0.02 to 0.50%, and
Ni: 0.02 to 0.50%.

15. The seamless steel pipe according to claim 14, wherein
the decarburized layer has a depth of 15 to 130 μm.

16. The seamless steel pipe according to claim 1, wherein
the decarburized layer has a depth of 15 to 130 μm.

17. The seamless steel pipe according to claim 1, wherein
the seamless steel pipe is an oil-well steel pipe.

\* \* \* \* \*